(12) United States Patent
Kwon et al.

(10) Patent No.: US 10,223,761 B2
(45) Date of Patent: Mar. 5, 2019

(54) GRAPHICS PIPELINE METHOD AND APPARATUS

(71) Applicant: Samsung Electronics Co., Ltd., Suwon-si (KR)

(72) Inventors: Kwontaek Kwon, Hwaseong-si (KR); Seok Kang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 149 days.

(21) Appl. No.: 15/003,320

(22) Filed: Jan. 21, 2016

(65) Prior Publication Data

US 2016/0379335 A1  Dec. 29, 2016

(30) Foreign Application Priority Data

Jun. 23, 2015  (KR) .................. 10-2015-0089092

(51) Int. Cl.
*G06T 1/20* (2006.01)
*G06T 5/00* (2006.01)
*G06T 11/40* (2006.01)

(52) U.S. Cl.
CPC ............. *G06T 1/20* (2013.01); *G06T 5/006* (2013.01); *G06T 11/40* (2013.01)

(58) Field of Classification Search
CPC ............ G06T 1/20; G06T 11/40; G06T 5/006
See application file for complete search history.

(56) References Cited

U.S. PATENT DOCUMENTS

| | | | |
|---|---|---|---|
| 5,809,219 A | 9/1998 | Pearce et al. | |
| 6,414,680 B1* | 7/2002 | Klosowski | G06T 15/20 345/423 |
| 6,700,584 B1 | 3/2004 | Wood | |
| 7,456,846 B1* | 11/2008 | King | G06T 15/005 345/613 |
| 7,532,222 B2* | 5/2009 | Stevenson | G06T 11/001 345/589 |
| 8,446,433 B1* | 5/2013 | Mallet | G06T 5/006 345/581 |
| 8,605,082 B2 | 12/2013 | Buchheit | |
| 2002/0122596 A1* | 9/2002 | Bradshaw | G06F 17/30256 382/226 |

(Continued)

FOREIGN PATENT DOCUMENTS

| | | |
|---|---|---|
| JP | 2012-14714 A | 1/2012 |
| KR | 10-1331047 B1 | 11/2013 |
| KR | 10-2014-0089222 A | 7/2014 |

OTHER PUBLICATIONS

Pohl, Daniel, et al., "Improved Pre-Wraping for Wide Angle, Head Mounted Displays," The 19th ACM Symposium on virtual reality software and technology, VRST'13; Singapore, 2013, pp. 1-4, XP055237173.

(Continued)

*Primary Examiner* — Tapas Mazumder
(74) *Attorney, Agent, or Firm* — Harness, Dickey & Pierce, P.L.C.

(57) ABSTRACT

Provided are a graphics pipeline method and apparatus. For each of plural screen pixels, locations of one or more sampling are determined based on a set pattern to modify an image to be rendered. A pixel corresponding to a set primitive is generated at a determined location of a sampling point, of the one or more sampling points. The image is rendered using the generated pixel.

18 Claims, 26 Drawing Sheets

(56) References Cited

U.S. PATENT DOCUMENTS

| | | | | |
|---|---|---|---|---|
| 2002/0140706 | A1* | 10/2002 | Peterson | G06T 11/001 345/611 |
| 2007/0040838 | A1* | 2/2007 | Jeffrey | G06T 3/40 345/501 |
| 2009/0051687 | A1* | 2/2009 | Kato | G06T 15/80 345/426 |
| 2009/0080803 | A1* | 3/2009 | Hara | G06T 15/04 382/285 |
| 2009/0154822 | A1 | 6/2009 | Cabral et al. | |
| 2011/0050694 | A1 | 3/2011 | Kim et al. | |
| 2012/0280998 | A1* | 11/2012 | Nordlund | G06T 15/005 345/428 |
| 2014/0192054 | A1 | 7/2014 | Yoo et al. | |
| 2015/0022537 | A1* | 1/2015 | Lum | G06T 11/40 345/522 |

OTHER PUBLICATIONS

European Search Report dated Jan. 2, 2017 for correasponding European Patent Application No. 16166072.5

Pohl, Daniel, et al. "Improved Pre-Warping for Wide Angle, Head Mounted Displays." *Proceedings of the 19th ACM Symposium on Virtual Reality Software and Technology*. ACM, 2013.

Segal, Mark, et al. "The OpenGL Graphics System: A Specification Version 4.5" *OpenGL 4.5 Core Profile*, Aug. 8, 2014.

Oculus VR LLC. "Oculus Developer Guide." *SDK Versiom 0.4.4.*, 2014.

"Barrel Distortion" *The Little Grasshopper*, Nov. 2015 http://github.prideout.net/barrel-distortion/.

Vlachos, Alex. "Advanced VR Rendering." *Game Developers Conference*, Powerpoint Presenation, San Francisco, CA, Mar. 4-6, 2015.

* cited by examiner

FIG. 2B
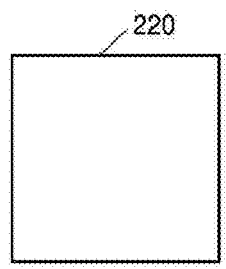 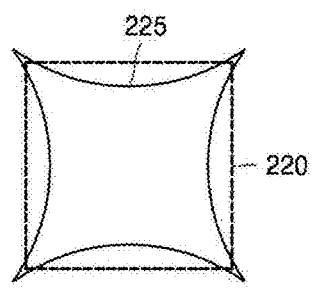
<ORIGINAL IMAGE: No distortion>    <DISTORTED IMAGE: Pincushion distortion>

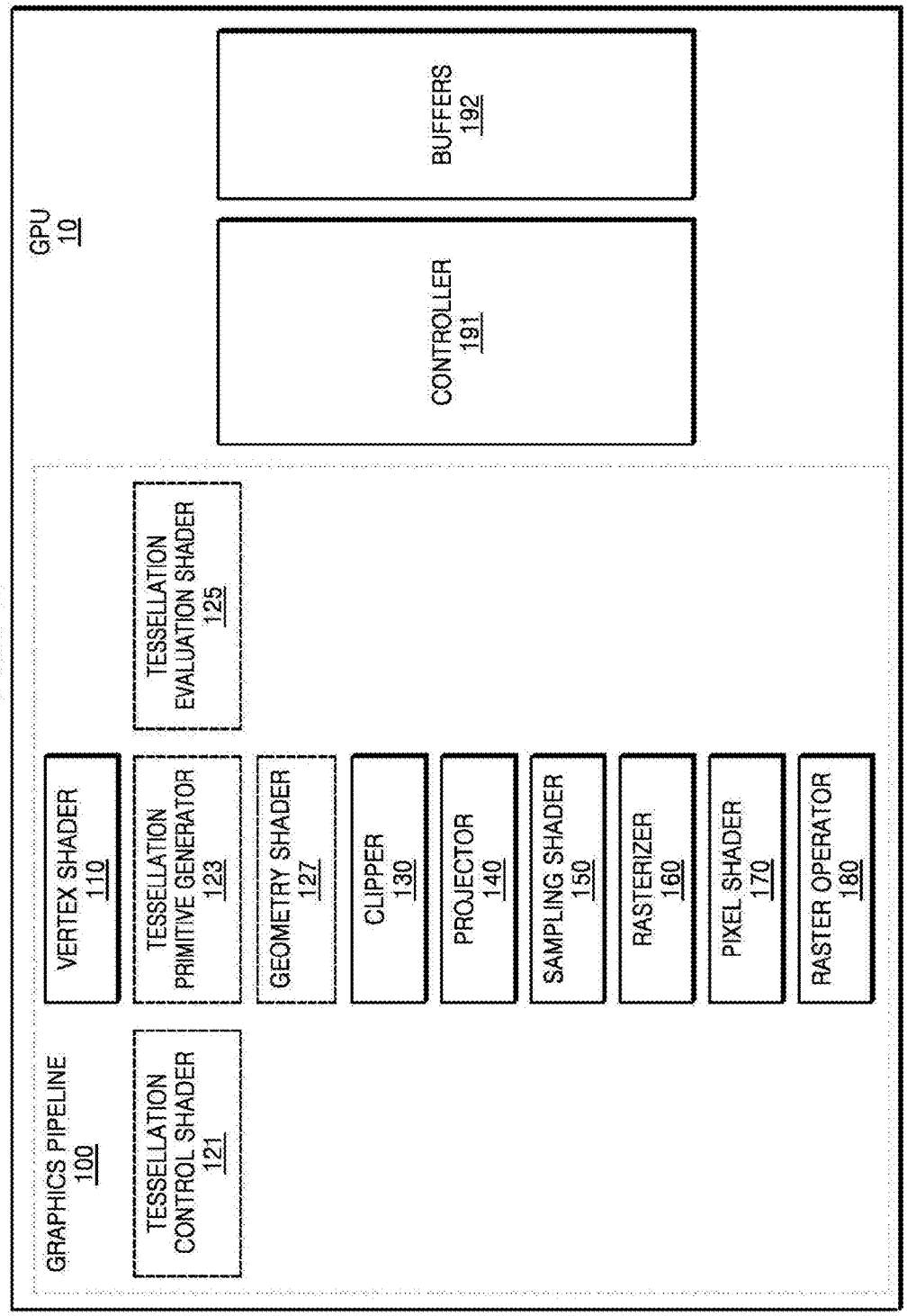

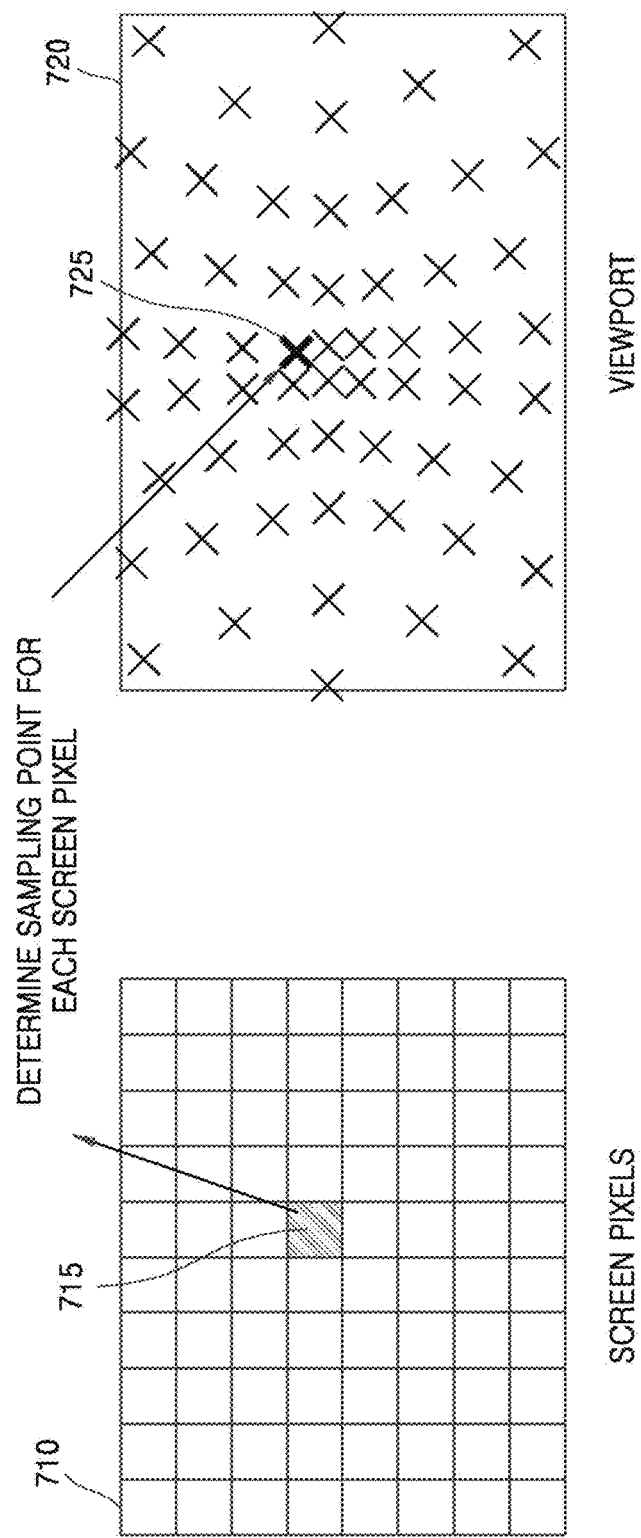

GRAPHICS PIPELINE METHOD AND APPARATUS

CROSS-REFERENCE TO RELATED APPLICATION

This application claims the benefit of Korean Patent Application No. 10-2015-0089092, filed on Jun. 23, 2015 in the Korean Intellectual Property Office, the disclosure of which is incorporated herein in its entirety by reference.

BACKGROUND

1. Field

One or more embodiments relate to a graphics pipeline method and apparatus.

2. Description of Related Art

Graphics processing devices or elements, such as graphics processing units (GPUs), may perform rendering of graphics data in a computing device. As only an example, such a graphics processing device may convert graphics data corresponding to two- or three-dimensional objects into two-dimensional pixel representations to generate a frame for a display.

SUMMARY

One or more embodiments include a graphics pipeline method, the method including determining, using one or more processing devices, respective locations of sampling points for plural screen pixels of a display, by determining, for each of the plural screen pixels, a location of a sampling point based on a set pattern to modify an image to be rendered, and generating a pixel based on the image and corresponding to a set primitive at a determined location of a sampling point, of the sampling points, determined to overlap the primitive set to be rasterized and rendering the image using the generated pixel.

The pattern may be a distortion pattern for applying distortion to the image so that the rendered image is a distortion image.

The determining of the respective locations may include determining the respective locations of the sampling points based on respective central locations of each of modified locations of the plural screen pixels, wherein the plural screen pixels may be arranged in an equal distant or repeated grid pattern.

The method may further include determining, when the pattern is selectively not applied, the respective locations of the sampling points by respectively mapping locations of pixels of the image based on unmodified locations of the plural screen pixels.

The method may further include acquiring information of a resolution of the plural screen pixels of the display, the resolution defining locations of the plural screen pixels, and the determining of the respective locations may further include converting, based on the information of the resolution, a location of a screen pixel, of the plural screen pixels, into a location of a corresponding sampling point based on the pattern, and mapping a location of a pixel of the image to the location of the corresponding sampling point.

The determining of the respective locations may be a programmable stage, implemented by the at least one processing device, processing a shader source code for changing and defining a pattern type, of plural pattern types, of the pattern.

A least one of the plural pattern types may be a pattern defined by user interaction, with a user interface of an electronic device implementing the graphics pipeline method, that identifies user selected points or areas of the image to modify.

A least one of the plural pattern types may be a non-linear pattern.

At least one of the plural pattern types may be a pattern that includes varying intervals between plural defined locations or points in the pattern. Here, the plural defined locations or points may be defined to have the varying intervals therebetween according to a preset algorithm set forth in the shader source code.

The determining of the respective locations may include determining locations of two or more sampling points for one screen pixel when multisampling is determined to be enabled, and determining a location of a single sampling point for the one screen pixel when the multisampling is determined to be disabled, and, when the multisampling is determined to be enabled, respective two or more sampling points determined for each of the screen pixels may be arranged in proportion to an extent to which locations of each of the plural screen pixels are set to be modified by the pattern so that the rendered image is a distortion image.

The determining of the respective locations may be performed in parallel with an operation of a vertex shading stage, a clipping stage, and a projection stage of a graphics pipeline, before an operation of a rasterizing stage of the graphics pipeline that performs the generating of the pixel.

The generating of the pixel may include determining the location of the sampling point by searching for the location of the sampling point, from among select one or more subsets of the determined respective locations of the sampling points, that overlaps the primitive based on a quadtree algorithm that calls for repeatedly subdividing a set of the sampling points into smaller subsets based on regions of a viewpoint to which the sampling points of the set respectively belong.

The determining of the respective locations may further include storing the determined respective locations to a memory in a quadtree format according to the quadtree algorithm, and the generating of the pixel may further include selectively reading from the memory only locations of select sampling points corresponding to the one or more subsets that are determined to represent regions that at least partially overlap the primitive and searching the read locations for sampling points of the one or more subsets that overlap the primitive.

The determining of the respective locations may include determining locations of respective sampling points for different color components for a screen pixel by respectively applying different offsets when determining the locations of the respective sampling points for the different color components for the screen pixel.

The determining of the respective locations may be performed in a single pass of a tile binning operation when the graphics pipeline is a graphics pipeline for tile-based rendering.

One or more embodiments may include non-transitory processor-readable recording medium that includes computer readable code to control at least one processing device to implement one or more embodiments described herein.

One or more embodiments include a graphics pipeline apparatus, the apparatus including a shader configured to determine respective locations of sampling points for plural screen pixels of a display, by determining, for each of the plural screen pixels, a location of a sampling point based on a set pattern to modify an image to be rendered, and a rasterizer configured to generate a pixel based on the image and corresponding to a set primitive at a determined location of a sampling point, of the sampling points, determined to overlap the primitive set to be rasterized, and to output the generated pixel to render the image.

The graphics pipeline apparatus may be an electronic device that further includes the display and a graphics processing device that includes the shader and rasterizer, and the rasterizer may generate a plurality of pixels, including the generated pixel corresponding to the primitive, to render the image and outputs the plurality of generated pixels to display the rendered image, as the image distorted in accordance with the pattern, on the display.

The apparatus may further include a memory, and the rasterizer may output the plurality of pixels by storing the plurality of pixels in the memory for displaying the rendered image on the display.

The pattern may be a distortion pattern for applying distortion to the image so that the rendered image is a distortion image.

The shader may determine the respective locations of the sampling points based on respective central locations of each of modified locations of the plural screen pixels, and the plural screen pixels may be arranged in an equal distant or repeated grid pattern.

The shader may be further configured to determine, when the pattern is selectively not applied, the respective locations of the sampling points by respectively mapping locations of pixels of the image based on unmodified locations of the screen pixels.

The shader may be further configured to acquire information of a resolution of the plural screen pixels of the display, the resolution defining locations of the plural screen pixels, and, in the determining of the respective locations, the shader may convert, based on the information of the resolution, a location of a screen pixel, of the plural screen pixels, into a location of a corresponding sampling point based on the pattern, and map a location of a pixel of the image to the location of the corresponding sampling point.

The shader may be configured as a programmable shader stage, of a graphics processing device, configured to process a shader source code for changing and defining a pattern type, of plural pattern types, of the pattern.

At least one of the plural pattern types may be a pattern defined by user interaction, with a user interface of an electronic device that includes the graphics pipeline apparatus, that identifies user selected points or areas of the image to modify.

At least one of the plural pattern types may be a non-linear pattern.

At least one of the plural pattern types may be a pattern that includes varying intervals between plural defined locations or points in the pattern. Here, the plural locations or points may be defined to have the varying intervals therebetween according to a preset algorithm set forth in the shader source code.

The shader may be configured to determine locations of two or more sampling points for one screen pixel when multisampling is determined to be enabled and configured to determine a location of a single sampling point for the one screen pixel when the multisampling is determined to be disabled, and, when the multisampling is determined to be enabled, respective two or more sampling points determined for each of the screen pixels may be arranged in proportion to an extent to which locations of each of the plural screen pixels are set to be modified by the pattern so that the rendered image is a distortion image.

The shader may make the determination of the respective locations before the rasterizer performs a rasterization of the generated pixel as the outputting of the generated pixel to render the image.

In the generating of the pixel, the rasterizer may determine the location of the sampling point by searching for the location of the sampling point, from among select one or more subsets of the determined locations of the sampling points, that overlaps the primitive based on a quadtree algorithm that calls for repeatedly subdividing a set of the sampling points into smaller subsets based on regions of a viewpoint to which the sampling points of the set respectively belong.

The apparatus may further include a memory, and, in the determining of the respective locations, the shader may be further configured to store the determined respective locations to the memory in a quadtree format according to the quadtree algorithm, and, in the generating of the pixel, the raseterizer may be further configured to selectively read from the memory only locations of select sampling points corresponding to the one or more subsets that are determined to represent regions that at least partially overlap the primitive and may be further configured to search the read locations for sampling points of the one or more subsets that overlap the primitive.

In the determining of the respective locations, the shader may determine locations of respective sampling points for different color components for a screen pixel by respectively applying different offsets when determining the locations of the respective sampling points for the different color components for the screen pixel.

One or more embodiments include a graphics pipeline apparatus, the apparatus including a shader configured to determine sampling points, determined for rendering an image, based on a set distortion pattern, a vertex shader configured to determine positions, in a three-dimensional space for vertices for a rendering of the image, a rasterizer configured to generate pixels for a rendering of the image with distortion, as defined by the set distortion pattern, using the determined sampling points, and a renderer to output the image with distortion using the generated pixels, wherein the rendering of the image with distortion is performed with a single pass of operating the shader, the vertex shader, and the rasterizer.

The graphics pipeline apparatus may be a graphics processing unit (GPU).

The single pass of operating of the shader may be performed in parallel with the single pass of operating the vertex shader.

The apparatus may further include a pixel shader configured to determine pixel color values for the generated image pixels, wherein the rendering of the image with distortion is performed with a single pass of operating the pixel shader, performed subsequent to the single pass operation of the shader.

Additional aspects will be set forth in part in the description which follows and, in part, will be apparent from the description, or may be learned by practice of embodiments.

BRIEF DESCRIPTION OF THE DRAWINGS

These and/or other aspects will become apparent and more readily appreciated from the following description of embodiments, taken in conjunction with the accompanying drawings in which:

FIGS. 2A to 2D are drawings describing types of distortion, according to one or more embodiments;

FIG. 5 is a block diagram illustrating a graphic processing unit (GPU), according to one or more embodiments;

FIG. 7 is a drawing describing a location of a sampling point corresponding to a screen pixel based on a distortion pattern, according to one or more embodiments;

DETAILED DESCRIPTION

Figure 1:
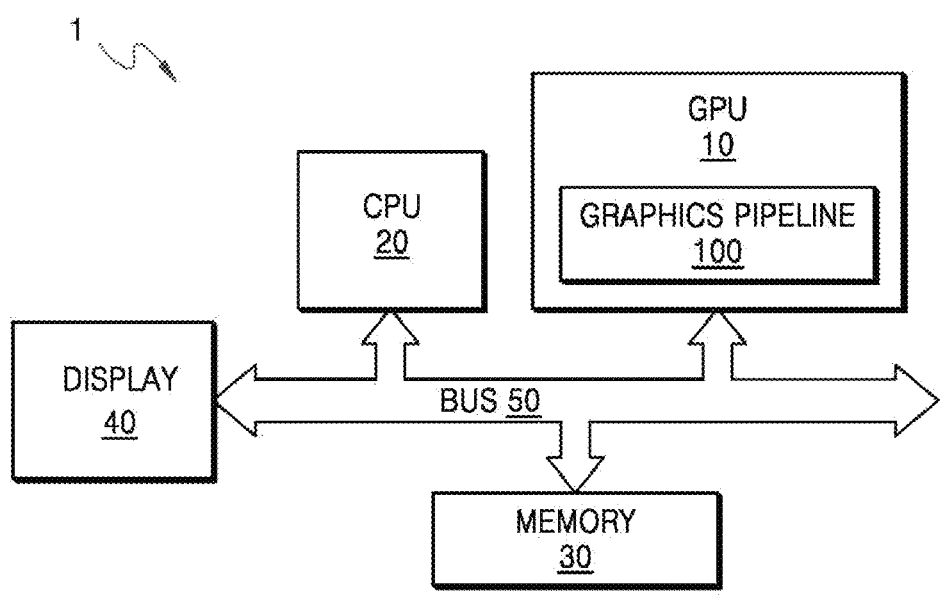
FIG. 1 is a diagram describing an electronic device, according to one or more embodiments.

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that may be well known to one of ordinary skill in the art, after an understanding of the present disclosure, may be omitted for increased clarity and conciseness.

The features described herein may be embodied in different forms, and are not to be construed as being limited to the examples described herein.

Various alterations and modifications may be made to the described embodiments, some of which will be illustrated in detail in the drawings and detailed description. However, it should be understood that these embodiments are not construed as limited to the illustrated forms and include all changes, equivalents, or alternatives within the idea and the technical scope of this disclosure.

Terms used herein are to merely explain specific embodiments, and thus are not meant to be limiting. A singular expression includes a plural expression except when two expressions are contextually different from each other. For example, as used herein, the singular forms "a," "an" and "the" are intended to include the plural forms as well, unless the context clearly indicates otherwise. The use of any and all examples, or exemplary language (e.g., "such as") provided herein, is intended merely to better illuminate the underlying concept and does not pose a limitation on the scope of the disclosure. Herein, the terms "include" or "have" are also intended to indicate that characteristics, figures, operations, components, or elements disclosed on the specification or combinations thereof exist. The term "include" or "have" should be understood so as not to pre-exclude the existence of one or more other characteristics, figures, operations, components, elements or combinations thereof or additional possibilities. In addition, terms including ordinal numbers such as 'first', 'second', etc., are used for convenience of description to describe or differentiate between various elements but the elements should not be defined by these terms, and unless contextually having a different meaning are not intended to represent a required sequence or ordering.

Unless otherwise defined, all terms including technical and scientific terms used herein have the same meaning as commonly understood by one of ordinary skill in the art to which this invention belongs, in view of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, certain embodiments will be explained in more detail with reference to the attached drawings, wherein like reference numerals refer to like elements throughout. Like or the same component or components corresponding to each other will be provided with the same reference numeral, and their detailed explanation will be omitted. When it is determined that a detailed description of a related or known function or configuration, after an understanding of the present disclosure, may make a purpose of an embodiment of the present disclosure unnecessarily ambiguous or verbose, such a detailed description may be omitted.

FIG. 1 is a diagram describing an electronic device, according to one or more embodiments.

Referring to FIG. 1, the electronic device 1 may include a GPU 10, a central processing unit (CPU) 20, a memory 30, a display 40, and a bus 50, for example, noting that elements in addition to the illustrated elements may be further included.

The electronic device 1, for example, may include a desktop computer, a notebook computer, a smartphone, a personal digital assistant (PDA), a portable media player, a video game console, a television set-top box, a tablet device, an e-book reader, a wearable device, an HMD device, or the like, but embodiments are not limited thereto. That is, various devices may be included in the scope of the electronic device 1 serving as a device configured to implement or control a graphics processing operation, e.g., for outputting content or for displaying content on a display, such as the display 40 of the electronic device 1.

The CPU 20 may be hardware for controlling the overall operations and functions of the electronic device 1. For example, the CPU 20 may drive an operating system (OS), call a graphics API for the GPU 10, and execute a driver of the GPU 10. In addition, the CPU 20 may execute various applications, for example, a web browsing application, a game application, a video application, etc., stored in the memory 30.

As a device for operating an example graphics pipeline 100, the GPU 10 may correspond to a graphics-dedicated processor. That is, the GPU 10 may be hardware implemented to operate a three-dimensional graphics pipeline for rendering three-dimensional objects on a three-dimensional image into a two-dimensional image for a display. For example, the GPU 10 may perform various functions such as shading, blending, and illuminating and various functions for generating pixel values for pixels to be displayed. Depending on embodiment, the GPU 10 may also or alternatively operate a tile-based graphics pipeline for tile-based rendering (TBR).

Referring to FIG. 1, the graphics pipeline 100 to be implemented by the GPU 10 may correspond to one of graphics pipelines defined by graphics APIs such as various versions of DirectX and Open Graphics Library (OpenGL) APIs, as only examples. That is, one or more of such graphics pipelines 100 according to differing embodiments are not limited to one version or any one API type, but may be implemented through various APIs.

As hardware for storing various types of data to be processed within the electronic device 1, for example, the memory 30 may store data processed in and data to be processed in the GPU 10 and/or the CPU 20, and there may be multiple memories 30, depending on embodiment. In addition, the memory 30 may store applications, drivers, etc. to be driven by the GPU 10 and/or the CPU 20. The memory 30 may include any or any combination of a random access memory (RAM) such as a dynamic RAM (DRAM) and/or a static RAM (SRAM), a read-only memory (ROM), an electrically erasable programmable ROM (EEPROM), a compact disc-ROM (CD-ROM), Blu-ray or another optical disc storage, a hard disk drive (HDD), a solid state drive (SSD), or a flash memory. Further, the memory 30 may represent an external storage device capable of being accessed by the electronic device 1.

The display 40 is hardware for displaying an image processed by the GPU 10. For example, the display 40 may display an image rendered by the GPU 10, including an image rendered by the GPU 10 so as to include distortion. The display 40 includes screen pixels having predetermined resolution and the GPU 10 may typically render an image suitable for that resolution. The display 40 may be implemented by various types of display panels such as a liquid crystal display (LCD) and an organic light-emitting diode (OLED), as only examples.

The bus 50 serves as hardware for connecting pieces of hardware so that data can be transmitted and received between the pieces of hardware within the electronic device 1. The bus 50, for example, may include various types such as a Peripheral Component Interconnect (PCI) bus and a PCI Express bus.

In particular, the electronic device 1 may operate the graphics pipeline 100 for modifying an original image and rendering a distorted image. In an embodiment, the electronic device 1 may be configured to enable a user to select a distortion, or may selectively apply distortion to an image based on user interaction with the electronic device 1, and accordingly operate the graphics pipeline 100 to distort and render a corresponding image. In addition, in one or more embodiments, the applied distortion may be a distortion or distortion pattern that reverses existing distortion in an input image, e.g., where an image capturing lens has faults or is known to distort captured scenes in a particular manner, as only examples. Example types of distortion will be described with reference to FIGS. 2A to 2D.

FIGS. 2A to 2D are drawings describing types of distortion, according to one or more embodiments.

Figure 2A:
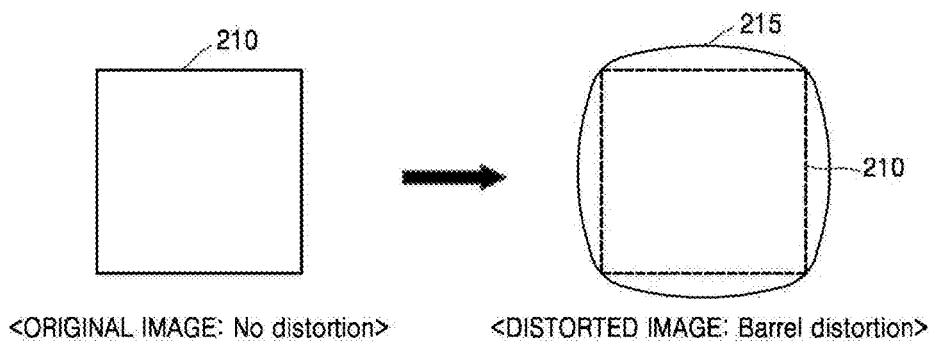

Referring to FIG. 2A, a distorted image 215 may occur due to barrel distortion having a spread shape in which distances between a center pixel and the other pixels of the original image 210 are caused to gradually increase with respect to the center pixel of the original image 210. The barrel distortion may be a distortion effect making the original image 210 appear to have been captured by a fisheye lens, for example. Of course, if an original image is known to have been captured by such a fisheye lens, a revering barrel distortion may distort the original image so the resultant distorted image actually appears less distorted. Referring to FIG. 2B, in contrast to the barrel distortion, the distorted image 215 may occur due to pincushion distortion having a contracted shape in which the distances between the center pixel and the other pixels of the original image 220 are caused to gradually decrease with respect to the center pixel of the original image 210. On the other hand, although not illustrated, mustache distortion in which the barrel distortion and the pincushion distortion are mixed may occur or be caused to occur.

Figure 2C:
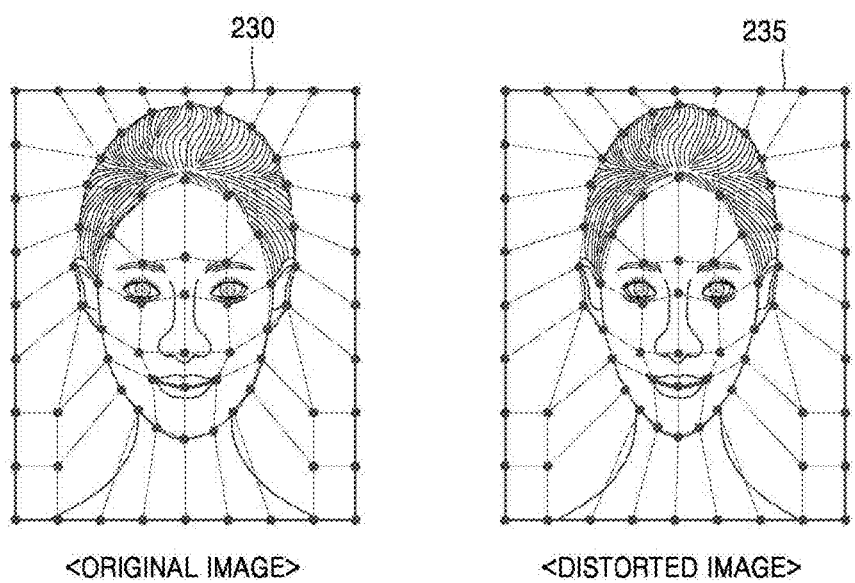
Figure 2D:
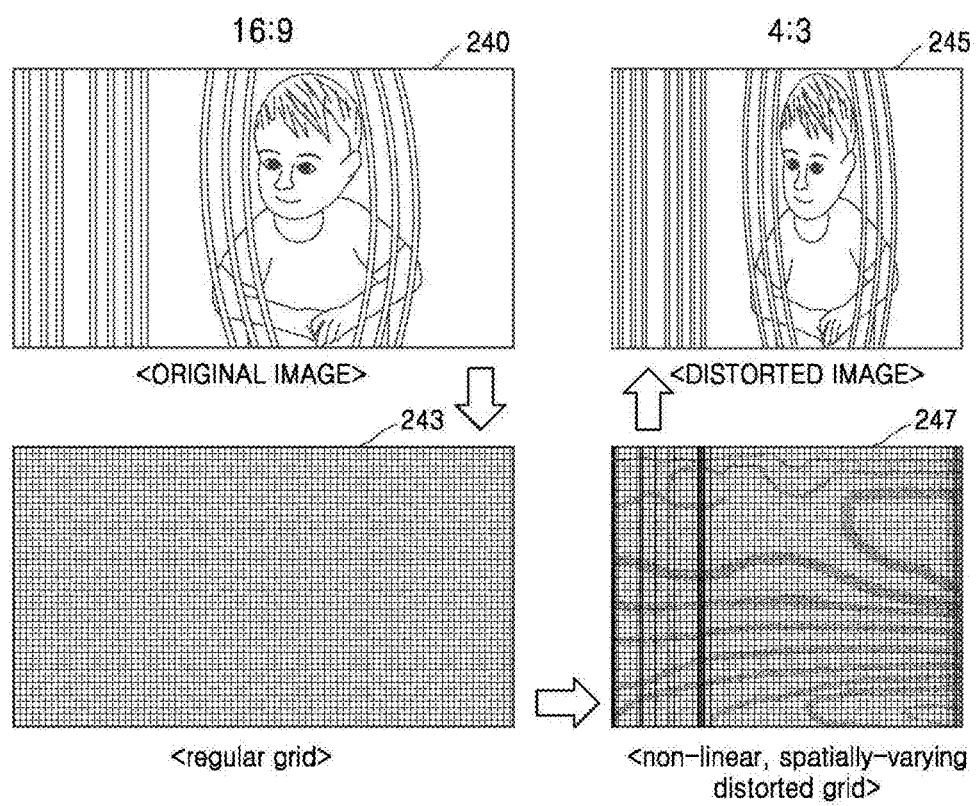

Referring to FIG. 2C, a distorted image 235 based on an example user's operation is illustrated. The distorted image 235 may be generated when the user arbitrarily operates or selects locations of points desired to be modified on the original image 230, e.g., using a user interface of the electronic device, in one or more embodiments. That is, unlike FIGS. 2A and 2B, the distorted image 235 may be nonlinearly generated in various shapes according to the user's preference. Referring to FIG. 2D, the case in which an original image 240 having a resolution of 16:9 is changed to a distorted image 245 having a resolution of 4:3 is illustrated. At this time, the distortion due to the resolution change may be a change of a pixel grid 243 of the original image 240 to a distortion grid 247 due to a nonlinear distortion pattern. Similar to FIG. 2C, the distorted image 245 of FIG. 2D may be a distorted image when the user arbitrarily designates a region desired to be modified. In addition to the demonstrated distortions of FIGS. 2A-2D, and only as examples, there are other types of distortions that may be applied to an image to either generate a distorted image with a desired distortion or with reduction of an existing distortion, e.g., through a distortion pattern or algorithm, depending on embodiment.

As only examples, such types of distorted images described in one or more embodiments may include a nonlinear distortion pattern according to operation of the user as well as a linear distortion pattern. That is, a distorted image to be described in embodiments is not limited to any one image. For example, the electronic device 1 of FIG. 1, particularly, the GPU 10, may render the original image into respective distorted images according to various distortion patterns.

Figure 3:
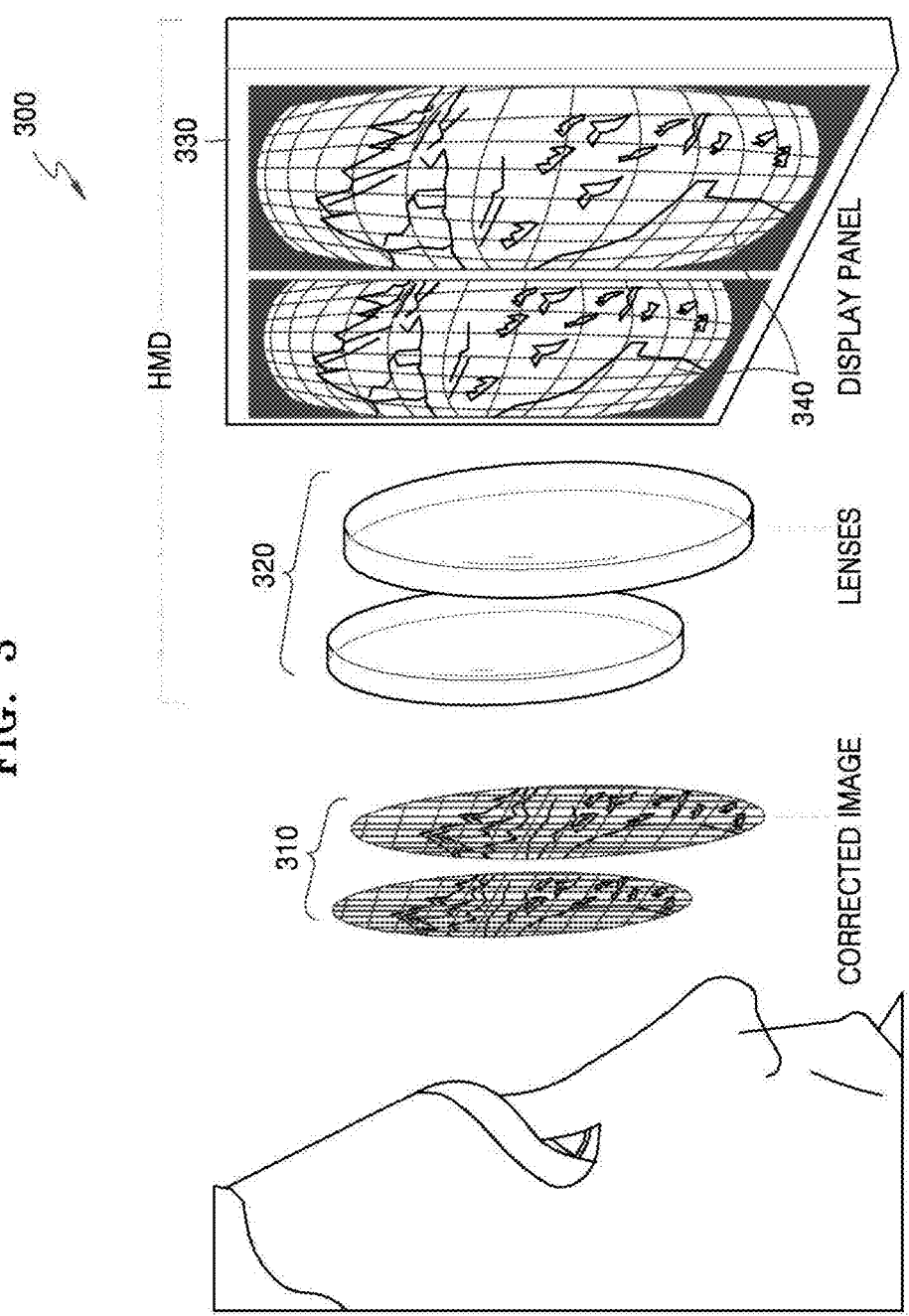
FIG. 3 is a drawing describing a head mounted display system that utilizes a distorted image, according to one or more embodiments.

FIG. 3 is a drawing describing a head mounted display system that utilizes a distorted image, according to one or more embodiments.

Referring to FIG. 3, and only an example, a distorted image 215 may be rendered so as to have the above described barrel distortion and utilized in an HMD system 300. The HMD system 300 is a type of image display system by which the user wearing the system on his/her head, such as wearing a pair of glasses, may immediately view images before his/her eyes. The HMD system 300 may be a HMD device that includes the illustrated lenses 320 and the display panel 330, or they may be separate device components of a system that pairs the display panel 330 with the lenses 320. The user may view a screen displayed on the display panel 330 through the lenses 320. The display panel 330 may be controlled to display a pair of distorted images 340, e.g., modified to have barrel distortion. However, because of a predetermined distorting characteristic of the lenses 320, the distorted images 310 are actually viewed (or appear) through the lenses 320 as undistorted images.

A distorted image rendered through the graphics pipeline 100 processed in the electronic device 1 (particularly, GPU 10) of FIG. 1, for example, may be used for the above-described HMD system 300, but embodiments are not limited thereto. As only an example of such a HMD system 300, in an embodiment, the electronic device 1 may be representative of the display panel 330 of the HMD system 300, so that such an HMD system/device embodiment may generate distorted images in accordance with the characteristics of the lenses 320 to provide the user with a desired virtual experience.

Figure 4A:
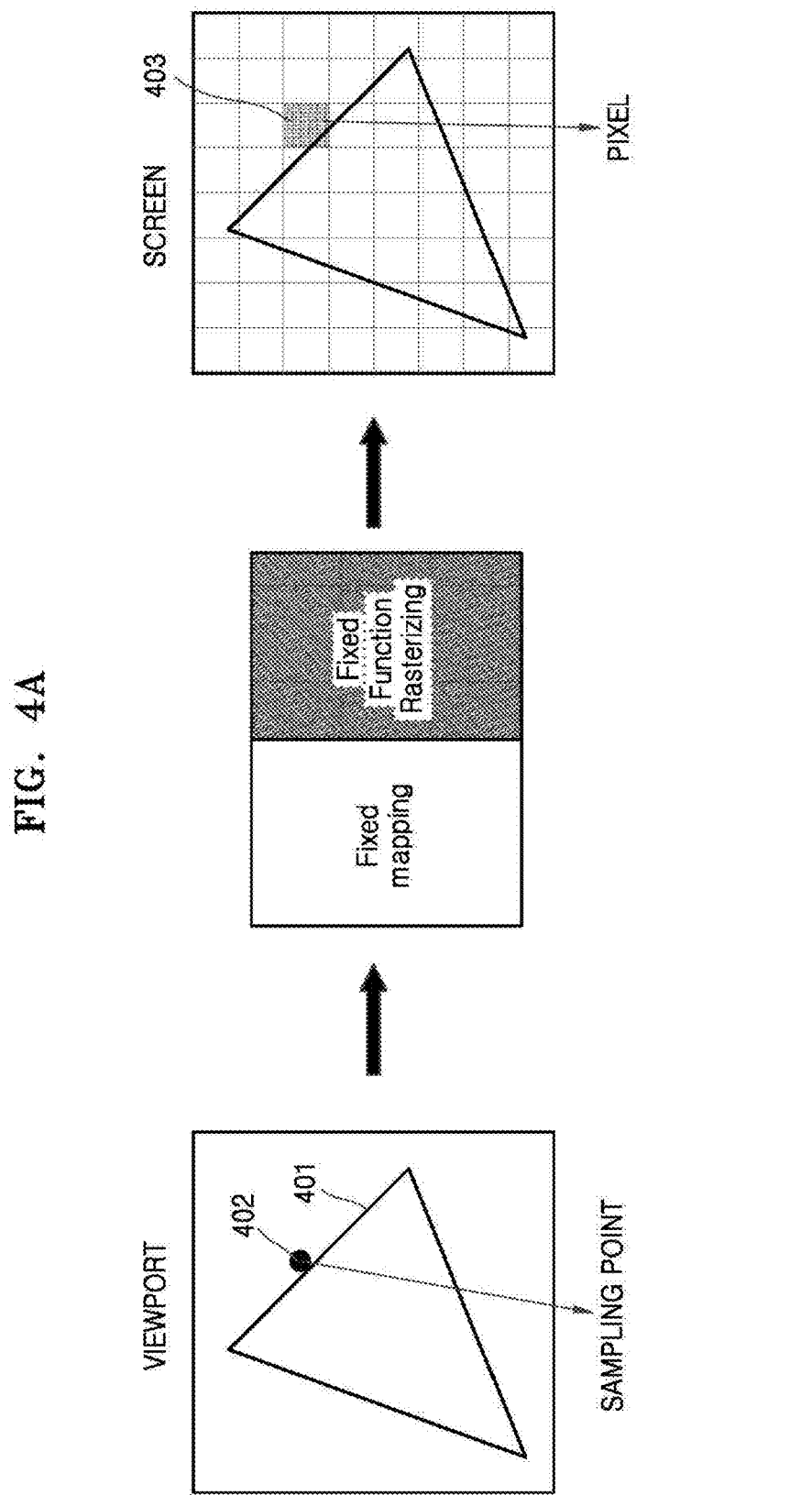
FIG. 4A is a drawing describing a method of determining a pixel of an image using a sampling point in a general graphics pipeline.

FIG. 4A is a drawing describing a method of determining a pixel of an image using a sampling point in a general graphics pipeline.

Referring to FIG. 4A, a location of a sampling point 402 on a viewport may be used to draw a triangular object 401 as image pixels. The location of the sampling point 402 on the viewport has a predetermined relationship with a particular pixel 403 of an image to be rendered on a display screen, i.e., according to a fixed 1:1 mapping of the graphics pipeline. In addition, according to a rasterizing (fixed 1:1 mapping) of the corresponding fixed operation of the graphics pipeline, a method of rasterizing the corresponding pixel 403 is implemented using object information (or primitive information) in the location of the sampling point 402 on the viewport.

Thus, in the general graphics pipeline for FIG. 4A, the location of the sampling point 402 and the pixel 403 of the image to be rendered on the display screen have a fixed mapping. In addition, because of this approach, when a distorted image is desired the general graphics pipeline must implement two passes of the rendering pipeline. The first pass renders a normal image before distortion. Then, in the second pass, a polygon mesh covering the entire screen is rendered with a texture on it. The rendered image from the first pass is used as the texture on the second pass. By adjusting vertex positions of the polygon mesh during the second pass, a distortion is applied by the second pass.

Accordingly, even when a distorted image is desired, the general graphics pipeline still performs rendering using this fixed 1:1 mapping to render the distorted image because the location of the sampling point 402 is expected to always be the same for the viewport and for the screen. In addition, the general graphics pipeline has to perform two passes of the pipeline process, a first pass to render the normal image and a second pass that applies the normal image as a texture whose vertices are then moved to apply the distortion.

Figure 4B:
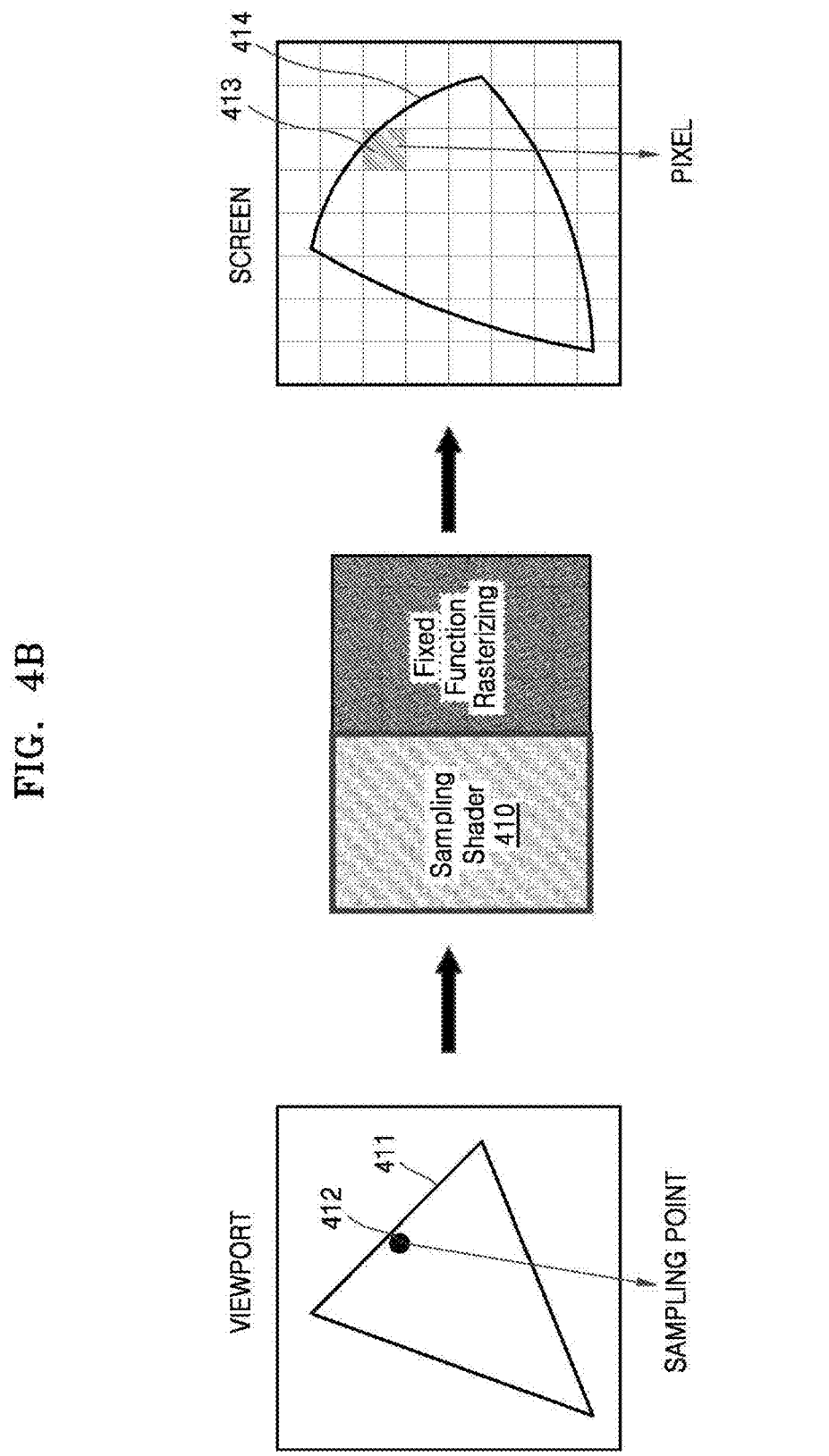
FIG. 4B is a drawing describing a method of determining a pixel of an image using a sampling point in a graphics pipeline, according to one or more embodiments.

FIG. 4B is a drawing describing a method of determining a pixel of an image using a sampling point in a graphics pipeline, according to one or more embodiments.

Referring to FIG. 4B, a sampling point 412 on the viewport is located within a triangular object 411. Though the sampling point 412 is located at a different location than the sampling point 402 of FIG. 4A, the location of a finally rendered pixel 413 corresponding to the sampling point 412 may actually be mapped to the same location as the pixel 403 of FIG. 4A. Thus, when the triangular object 411 is modified to a triangular object 414 in accordance with any corresponding distortion pattern applied to the mapping of the locations of the sampling points, the location of the sampling point 412 located within the triangular object 411 may correspond to the location of any one pixel 413 within the distorted triangular object 414, while the similar location of the pixel 403 was rendered outside the triangular object on the screen in FIG. 4A. The above-described mapping between the sampling point 412 and the pixel 413 may be performed by a sampling shader 410, for example, within the graphics pipeline 100 of FIG. 1.

As demonstrated in FIG. 4A, in the general graphics pipeline the mapping relationship between the location of the sampling point 402 and the location of the pixel 403 is fixed according to the fixed mapping. Accordingly, with the general graphics pipeline, the location of the pixel 403 cannot be changed even if the triangular object 401 is distorted, thereby requiring the general graphics pipeline described with reference to FIG. 4A to processes the desired distortion in different stages or passes within the general graphics pipeline without changing the mapping relationship between the sampling point 402 and the pixel 403.

However, as demonstrated in FIG. 4B and in one or more embodiments, the graphics pipeline 100 may merely incorporate a sampling shader 410 (instead implementing the fixed mapping of FIG. 4A) to render a distorted image, e.g., in a single stage or pass.

FIG. 5 is a block diagram illustrating a GPU, such as the GPU 10 of FIG. 1, according to one or more embodiments.

Here, though FIG. 5 will be explained with reference to the GPU 10 of FIG. 1, embodiments are not limited thereto, and alternate implementations and applications are also available.

Referring to FIG. 5, the GPU 10 may include a vertex shader 110, a tessellation control shader 121, a tessellation primitive generator 123, a tessellation evaluation shader 125, a geometry shader 127, a clipper 130, a projector 140, a sampling shader 150, a rasterizer 160, a pixel shader 170, and a raster operator 180, for example, to implement the graphics pipeline 100. In addition, the GPU 10 may further include a controller 191 and buffers 192. Each or any of above-described components for implementing the graphics pipeline 100 may alternatively be implemented by program logics or software present on/in non-transitory media to control at least one processing device to implement the same. In addition, the above-described components to implement the graphics pipeline 100 may be implemented by sub-processing devices (or processor cores) or one processing device provided within the GPU 10, as only an example. That is, a form of implementing the above-described components to implement the graphics pipeline 100 is not limited to any one hardware or non-transitory medium approach.

Further, although names of some components of graphics pipeline 100 are used to describe at least one underlying operation, e.g., as to be described further below and depending on embodiment, those skilled in the art will understand that the names of the components should not be considered limiting of any feature or embodiment. In this regard, merely for convenience of description, some names for components defined in OpenGL 4.5 are also used as names of components to implement the graphics pipeline 100 in the GPU 10. Again noting that names of such components should not be considered as limiting the embodiments to any particular standard or types of API's. That is, in one or more embodiments, the components to implement the graphics pipeline 100 in the GPU 10 may correspond to similar components defined in other types of APIs such as other versions of OpenGL, Microsoft's DirectX (DX), and Compute Unified Device Architecture (CUDA). For example, those skilled in the art will understand that the tessellation evaluation shader 125 may correspond to a domain shader used in DX and other components within the GPU 10 may similarly correspond to components used in other APIs such as DX and CUDA. In addition, the components indicated by the dotted line in FIG. 5, that is, the tessellation control shader 121, the tessellation primitive generator 123, the tessellation evaluation shader 125, and the geometry shader 127, may be included in the GPU 10 or may not be included in the GPU 10, depending on embodiment.

Figure 6:
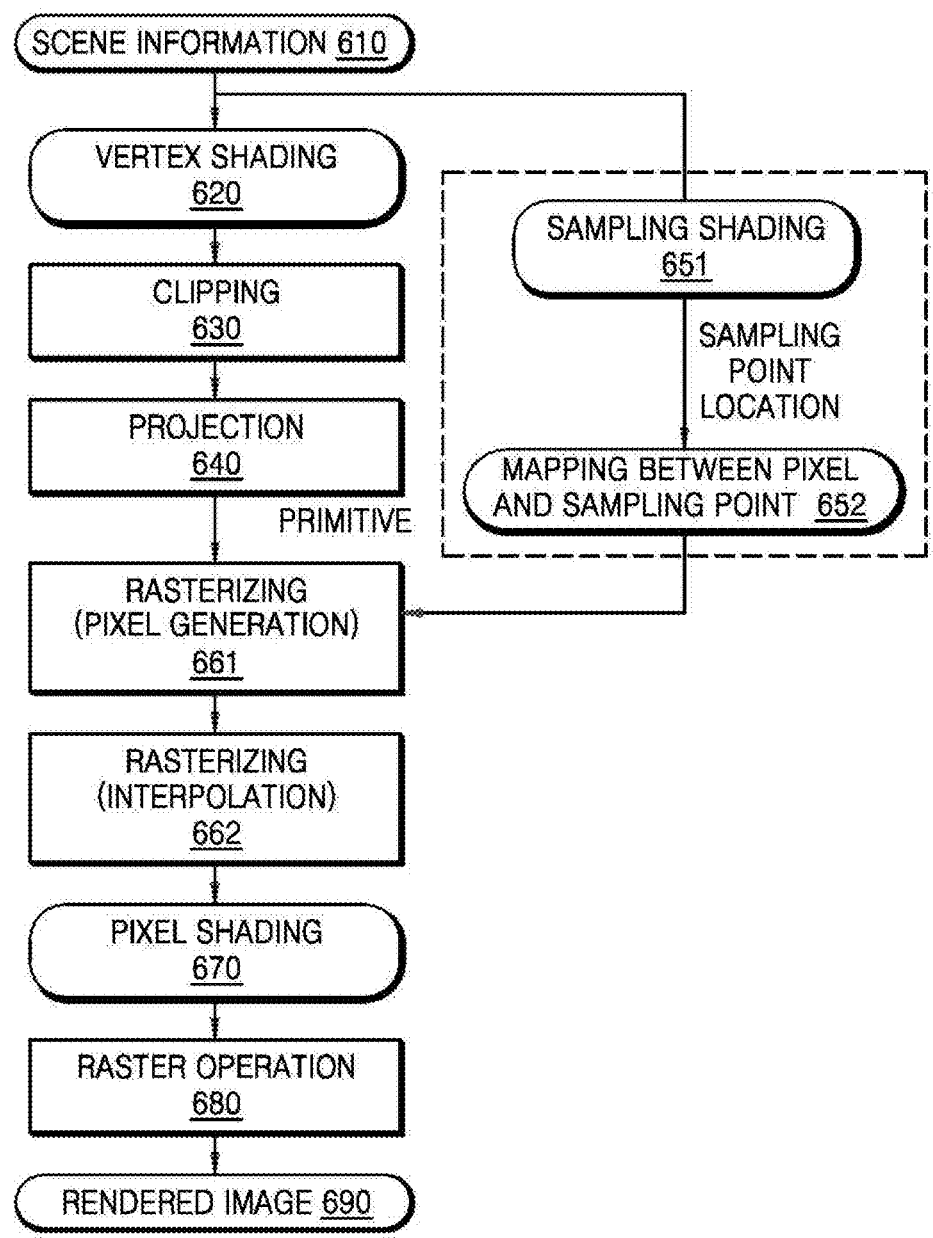
FIG. 6 is a flowchart of a graphics pipeline for rendering an image, according to one or more embodiments.

FIG. 6 is a flowchart of a graphics pipeline rendering an image, according to one or more embodiments. Hereinafter, the graphics pipeline 100 to be operated in the GPU 10, as only an example, will be described with reference to FIGS. 5 and 6. Here, though FIGS. 5 and 6 will be explained with reference to the GPU 10 of FIG. 1, embodiments are not limited thereto, and alternate implementations and applications are also available.

In operation 610, the GPU 10 acquires or is provided scene information (scene description) for screen pixels of a display, such as the display panel 40 of FIG. 1, stored in the memory, such as the memory 30 of FIG. 1. The scene information for the screen pixels may include information about the screen resolution of the display, matrix locations of the screen pixels, etc. In addition, the GPU 10 may also acquire or be provided scene information about vertices constituting objects stored in the memory.

In operation 620, the vertex shader 110 may determine coordinates in a three-dimensional space for each vertex using information about locations and attributes of vertices included in the scene information, etc.

In operation 630, the clipper 130 may clip and cull the remaining primitives other than primitives included in a field of view (that is, a viewport) of a camera among primitives constituted of the vertices output from the vertex shader 110. Locations of the primitives belonging to the field of view may be designated by coordinates in a normalized device coordinate (NDC) system.

In operation 640, the projector 140 may convert coordinates of primitives located on the NDC system into screen coordinates on the screen space.

In operation 651, the sampling shader 150 may also acquire or be provided information about screen pixels of the display. For example, the sampling shader 150 may acquire the screen resolution and scene information of screen pixels about matrix locations of screen pixels, etc.

Thereafter, in operation 652, the sampling shader 150 determines, for each of the screen pixels, locations of one or more sampling points based on a varying pattern or algorithm, for example, for representing an image to be rendered. For example, the sampling shader 150 may, to distort the original image, determine the locations of the one or more sampling points based on a distortion pattern for each of the screen pixels. That is, the sampling shader 150 may determine a respective sampling point for each of a number of screen pixels, e.g., depending on the screen resolution. Here, as only examples, the distortion pattern may apply any of the distortions described above with reference to FIGS. 2A to 2D or may be designed to compensate for the same, again noting that alternative distortions may also be applied or corrected for.

The sampling shader 150 may determine locations of one or more sampling points based on a center location of each of the modified screen pixels, i.e., the center location of the screen pixel based on the applied distortion pattern. Accordingly, the sampling shader 150 converts a location of the screen pixel, e.g., dependent on the resolution of the display, based on the distortion pattern into a location of the corresponding sampling point. For example, when an input of the sampling shader 150 has a value of "pixelLocation.x, pixelLocation.y," which are location coordinates of any particular screen pixel, the output of the sampling shader 150 may include a value of "sampleLocation.x, sampleLocation.y," which are location coordinates of the corresponding sampling point for that particular screen pixel. That is, the sampling shader 150 may perform an operation of converting or mapping the location "pixelLocation.x, "pixelLocation.y" into the location "sampleLocation.x, sampleLocation.y" through an algorithm that defines or represents the desired distortion pattern. The algorithm that defines or represents the distortion pattern may be an algorithm that implements varying linear mappings, such as for the barrel distortion, the pincushion distortion, etc., or an algorithm that implements non-linear mappings, e.g., according to any operation of the user.

In addition, to implement one or more embodiments, among the stages or components within the graphics pipeline 100, the sampling shader 150 may be a programmable shader that is configured to process a shader source code. For example, the shader source code may be designed to enable a user to freely change and define the type of linear distortion and/or non-linear distortion where locations of sampling points may be determined according to the user's setting. Accordingly, sampling shading of operation 651 may be a programmable stage of the graphics pipeline 100.

Accordingly, in operation 652, the sampling shader 150 may map a location for a pixel for a distorted image to be rendered to a location of a sampling point based on the desired distortion. The mapping relationship between the location for the pixel for the distorted image to be rendered and the location of the sampling point based on the desired distortion may be stored in the buffers 192, e.g., in the form of a lookup table.

In one or more embodiments, operations 651 and 652 to be performed by the sampling shader 150 may be performed in parallel with operations 620 to 640. That is, operations 651 and 652 performed by the sampling shader 150 are performed before the rasterizing stage of operation 661. Information generated in operations 651 and 652 may be available to the rasterizer 160.

Returning to operation 640, when operation 640 has been completed, the projector 140 outputs information about the primitives having the screen coordinates on the viewport to the rasterizer 160.

In operation 661, the rasterizer 160 determines a pixel corresponding to a primitive at a mapped location of a sampling point overlapping a primitive to be rasterized, from among the sampling points determined by the sampling shader 150. First, the rasterizer 160 may search for a sampling point present within coordinates of vertices making up a primitive, from among coordinates of the sampling points. Thereafter, the rasterizer 160 may determine the pixels for a distorted image to be rendered in correspondence with respectively found sampling points overlapping the primitive, e.g., by referring to a lookup table stored in the buffers 192.

In operation 662, the rasterizer 160 determines an attribute value for a determined pixel. Thereby, the rasterizer 160 may generate an image pixel for each sampling point.

In operation 670, the pixel shader 170 determines pixel color values for generated image pixels to shade pixels of the distorted image.

In operation 680, the raster operator 180 performs any additionally predefined pixel operations such as stencil, z test, and blending for every pixel.

In operation 690, the GPU 10 completes the rendering of the distorted image and outputs the rendered distorted image to the display 40 when the raster operation stage (operation 680) is completed.

As described above, in an embodiment, the rendering of the distorted image may be performed within one pass of the graphics pipeline 100. Accordingly, in one or more embodiments, because of the sampling shading operation for determining the sampling point, an additional pass for rendering the distorted image is not separately necessary, so it is possible to reduce a calculation amount and performance degradation of the GPU 10 compared to a general graphics pipeline that requires the additional pass to the render such a distorted image.

In an embodiment, the controller 191 may control the respective and/or overall operations of the components 110 to 180 of the graphics pipeline 100 and the buffers 192.

The buffers 192 may store information to be processed within the GPU 10, for example, information about sampling points, etc. In addition, the buffers 192 may receive information to be processed by the GPU 10, for example, scene information, vertex information, etc., from the memory and temporarily store the received information.

In one or more embodiments, the tessellation control shader 121, the tessellation primitive generator 123, and the tessellation evaluation shader 125 are also included in the GPU for the tessellation of the primitive. In one or more embodiments, the geometry shader 127 may also be included in the GPU 10 to generate one or more additional output primitives for a single primitive.

FIG. 7 is a drawing describing a location of a sampling point corresponding to a screen pixel based on a distortion pattern, according to one or more embodiments.

Referring to FIG. 7, in this example the distortion pattern will be assumed to be pincushion distortion. As noted above, pincushion distortion may be applied by a distortion pattern in which an image is gradually reduced toward the center. Accordingly, a grid of sampling points may be a grid of a modified shape corresponding to a pincushion distortion pattern focused on the center rather than a grid of a regular grid pattern shape corresponding to grid pattern of screen pixels 710. For example, for the 1:1 fixed correspondence discussed above with the general graphics pipeline of FIG. 4A, the grid of the sampling points would mirror screen pixels 710, e.g., with each sampling point being aligned with a center of screen pixel. Therefore, the location of a sampling point 725 corresponding to a particular pixel 715 may be determined to be any location focused toward a center direction on a viewport 720, depending on the underlying pincushion algorithm. For example, a sampling shader, such as the sampling shader 150 of FIG. 5, may determine the mapped locations of all of the sampling points corresponding to the screen pixels 710 based on the pincushion distortion pattern.

Figure 8A:
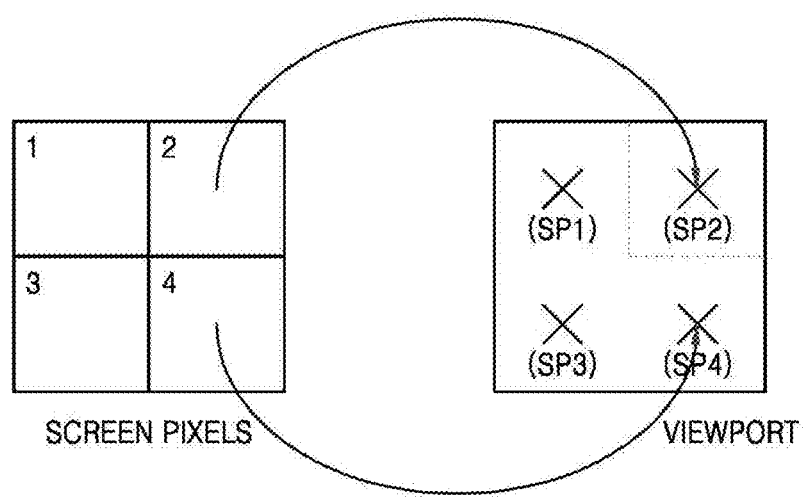
FIG. 8A is a drawing describing a method of determining a sampling point corresponding to a screen pixel when a distortion pattern is not applied, according to one or more embodiments.

FIG. 8A is a drawing describing a method of determining a sampling point corresponding to a screen pixel when a distortion pattern is not applied, according to one or more embodiments. Below, while aspects of FIGS. 8A and 8B may be explained with reference to components or operations of FIGS. 1, 5, and 6, embodiments are not limited to the same and alternative implementations and applications are available.

Referring to FIG. 8A, when a distortion pattern is not applied, the location of a sampling point corresponding to a particular screen pixel may be determined to be a location corresponding to a center location of the screen pixel on the viewport. For example, the location of a sampling point SP2 corresponding to a screen pixel 2 may be determined to be a center location of a region corresponding to a region of the screen pixel 2 on the viewport. However, such as when multi-sampling anti-aliasing is implemented, the location of the corresponding sampling point may be determined to be a location within the region but at a constant offset from the center location of the region, e.g., in place of the center location of the screen pixel, according to the setting of a graphics pipeline, such as the graphics pipeline 100 of FIG. 5. Alternatively, in an embodiment, the location of the corresponding sampling point may be determined to be a location, within the region, that is arbitrarily set by the user. That is, though the case in which the location of the corresponding sampling point corresponds to the center location of the screen pixel has been described, this description is for convenience of description, and embodiment are not limited thereto. In an embodiment, when distortion is not applied, a sampling shader, such as the sampling shader 150 of FIG. 5, may not operate or may only pass sampling point locations that have such fixed correspondences with the locations of the respective screen pixels.

Figure 8B:
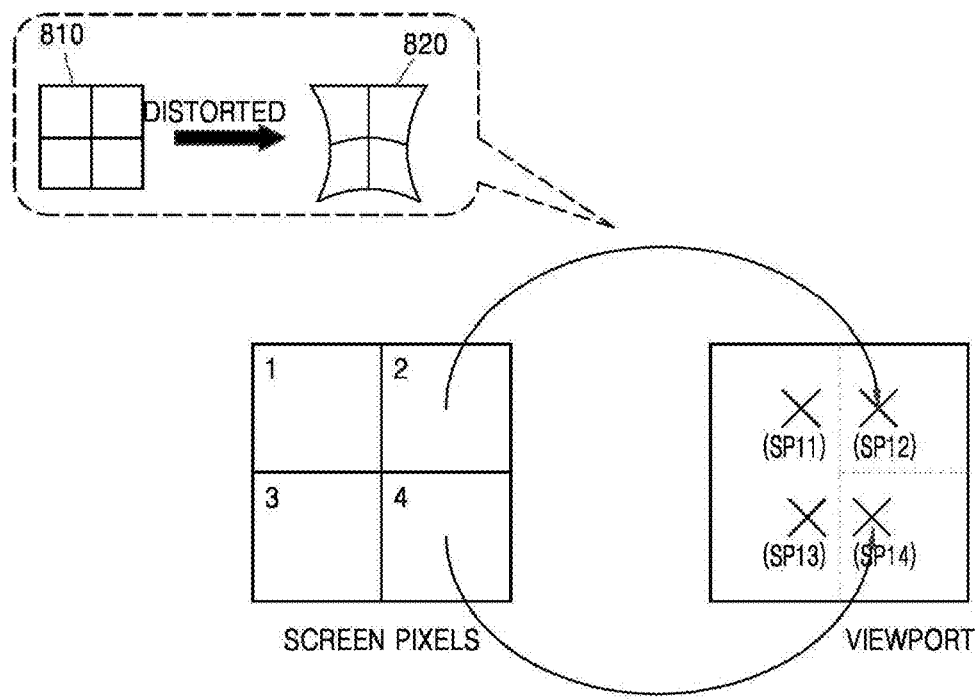
FIG. 8B is a drawing describing a method of determining a sampling point corresponding to a screen pixel based on an applied distortion pattern, according to one or more embodiments.

FIG. 8B is a drawing describing a method of determining a sampling point corresponding to a screen pixel based on an applied distortion pattern, according to one or more embodiments.

Referring to FIG. 8B, in this example the distortion pattern will be assumed to be pincushion distortion. Accordingly, as illustrated in FIG. 8B, screen pixels of a grid pattern 810 are to be modified so as to produce a distorted image 820 according to the distortion pattern (pincushion distortion pattern). Accordingly, the mapped location of the sampling point SP12 corresponding to the screen pixel 2 may be determined to be a location slightly separated in, or mapped toward, an upper-left direction from a center location of a region corresponding to a region of the screen pixel 2 on the viewport. In addition, the location of a sampling point SP14 corresponding to a screen pixel 4 may also be determined to be a location slightly separated in, or mapped toward, an upper-left direction from a center location of a region corresponding to a region of the screen pixel 4 on the viewport.

That is, a sampling shader, such as the sampling shader 150 of FIG. 5, may determine a sampling point (or a mapped location of the sampling point) corresponding to a screen pixel based on a distortion pattern through a sampling shading stage (e.g., operation 651 of FIG. 6) within a graphics pipeline, such as the graphics pipeline 100 of FIG. 5. Accordingly, for rendering a distorted image, the sampling shader may differently determine the location of the sampling point as a location at which a distortion pattern is reflected as compared with when no distortion is being applied.

Figure 9:
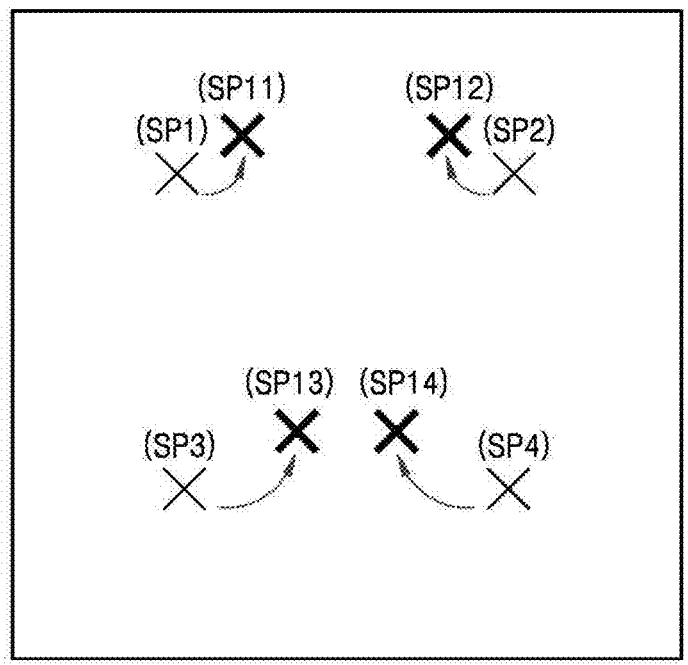
FIG. 9 is a drawing describing a comparison between a location of a sampling point when distortion is not applied and a location of a sampling point when distortion is applied, according to one or more embodiments.

FIG. 9 is a drawing describing a comparison between a location of a sampling point when distortion is not applied and a location of a sampling point when distortion is applied, according to one or more embodiments. Here, while aspects of FIG. 9 may be explained with reference to components of FIG. 5, embodiments are not limited to the same and alternative implementations and applications are available.

Referring to FIG. 9, locations of sampling points SP1, SP2, SP3, and SP4, such as illustrated in FIG. 8A, represent locations of the sampling points when distortion is not applied. On the other hand, locations of sampling points SP11, SP12, SP13, and SP14 represent mapped locations of the sampling points determined by a sampling shader, such as the sampling shader 150 of FIG. 5, when distortion is applied. That is, because the locations of the sampling points SP11, SP12, SP13, and SP14 are determined based on the distortion pattern (pincushion distortion pattern), the locations are determined to be slightly separated from the center locations of the regions on the viewport corresponding to the screen pixels as compared with the locations of the sampling points SP1, SP2, SP3, and SP4. Although the location of the sampling points have been described with the example of the pincushion distortion pattern with reference to FIGS. 8B and 9, embodiments are not limited thereto. The location of the sampling point may be determined in similar schemes even in the case of various different distortion patterns.

Figure 10:
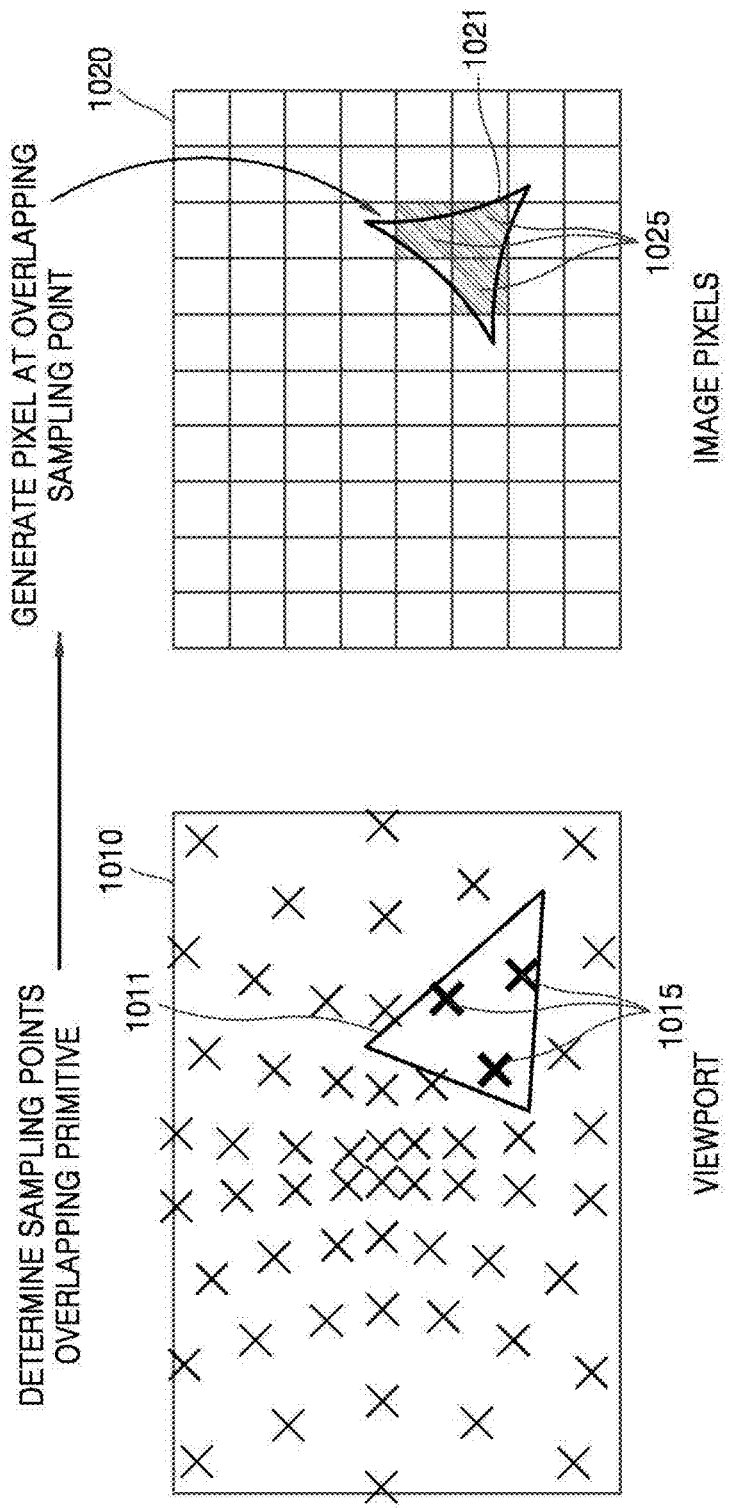
FIG. 10 is a drawing describing a method of performing rasterizing for pixel generation using sampling points determined by a sampling shader, according to one or more embodiments.

FIG. 10 is a drawing describing a method of performing rasterizing for pixel generation using sampling points determined by a sampling shader, according to one or more embodiments. Here, while aspects of FIG. 10 may be explained with reference to components or operations of FIG. 5, embodiments are not limited to the same and alternative implementations and applications are available.

Referring to FIG. 10, due to a distortion pattern, a sampling grid of all sampling points with respective locations illustrated on a viewport 1010 may thus have a form that is modified or different from a regular grid form. When a triangular primitive 1011 is included on the viewport 1010, the rasterizer, such as the rasterizer 160 of FIG. 5, may determine that only some of sampling points 1015 overlap the primitive 1011, from among all sampling points that may be necessary for pixel generation. Thereafter, the rasterizer may perform the pixel generation, after determining locations of pixels 1025 corresponding to those sampling points 1015 that overlap the primitive 1011, based on information about the mapping relationship between the sampling point and the pixel stored in the buffers, such as buffers 192 of FIG. 5. Because of the locations of the pixels 1025, among all image pixels 1020, an object 1021 may accordingly be drawn (rendered) with a form that is different, based on the distortion pattern, from the triangular form of the primitive 1011.

That is, in one or more embodiments, the graphics pipeline, such as graphics pipeline 100 of FIG. 5, may render a distorted image by determining a location of a sampling point based on a distortion pattern as described with reference to FIGS. 7, 8B, 9, and 10 using a sampling shader, such as sampling shader 150 of FIG. 5. Accordingly, a distorted image may be rendered by rendering an object at a pixel location based on the mapped location of the sampling point.

Figure 11:
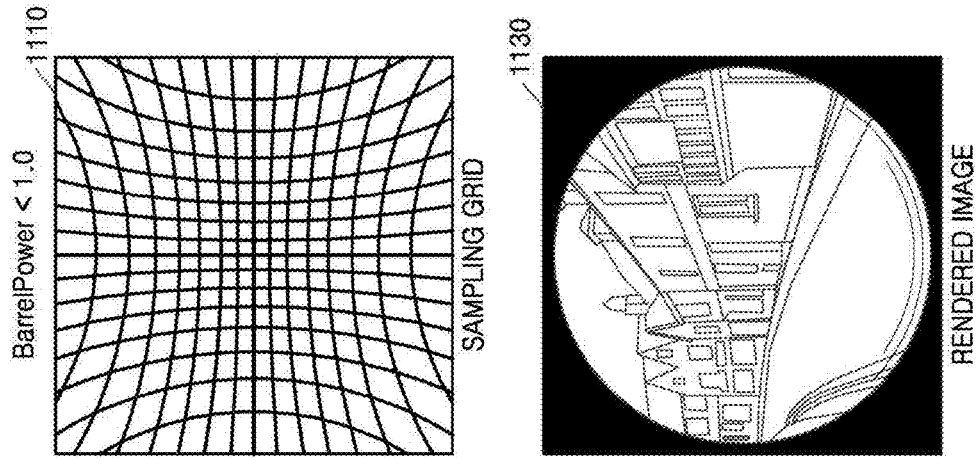
FIG. 11 is a drawing describing an example of a shader source code for determining a sampling point based on a barrel distortion pattern, according to one or more embodiments.

FIG. 11 is a drawing describing an example of a shader source code for determining a sampling point based on a barrel distortion pattern, according to one or more embodiments. Here, while aspects of FIG. 11 may be explained with reference to components or operations of FIG. 5, embodiments are not limited to the same and alternative implementations and applications are available.

Referring to a shader source code 1120 illustrated in FIG. 11, the coding "in vec2 pix_pos; //NDC coordinate [−1, 1]" may serve as code indicating an input of a sampling shader, such as the sampling shader 150 of FIG. 5, and indicates that locations pixpos of screen pixels on the example NDC system correspond to the input of the sampling shader. As code indicating an output of the sampling shader, coding "out vec2 sampling_pos; //NDC coordinate [−1, 1]" may indicate that locations of sampling points on the NDC system correspond to the output of the sampling shader.

The coding "uniform float BarrelPower; vec2 Distort (vec2 p) {float theta=a tan(p.y, p.x); float radius=length(p); radius=pow(radius, BarrelPower); p.x=radius*cos(theta); p.y=radius*sin(theta); return p;}" may indicate an operation for defining barrel distortion.

The coding "void main( ) {float d=length(pix_pos, xy); if (d<1.0) {sampling_pos=Distort(pix_pos);} else {discard( );}" may indicate an operation defining that only sampling points in which a distance from the center on the viewport is less than 1 are generated as pixels and sampling points in which the distance from the center on the viewport is greater than or equal to 1 are discarded. Such a discarding or skipping operation is discussed in greater detail below with regard to FIG. 17.

Accordingly, the defined sampling grid 1110 based on the barrel distortion pattern is not a regular grid pattern, as discussed above. That is, the sampling grid 1110 based on the barrel distortion pattern is focused in the center direction. The respective locations of the sampling points may be determined as being the center locations of the respective cells of the defined grid. Consequently, when such a shader source code 1120 for the sampling shader or shader operation is executed, a distorted image 1130 may be rendered. As illustrated in FIG. 11, with the barrel distortion being implemented by the barrel distortion pattern, the distorted image 1130 is distorted to appear as if captured by a fisheye lens.

In one or more embodiments, when the example sampling shader 150 is a programmable shader, for example, the user may select or program various types of shader source codes defining various distortion patterns or locations of various sampling points as well as the shader source code 1120 of FIG. 11 to operate the sampling shader 150. Depending on embodiment, such shader source code 1120 may be recorded or stored in a non-transitory medium, such as a memory of the electronic device, a memory of the GPU, or memory of such a programmable shader, as only examples, so that the shader source code 1120 is capable of being controlling of the operation at least one processing device or element to implement such a sampling shading operation, as discussed herein.

Figure 12:
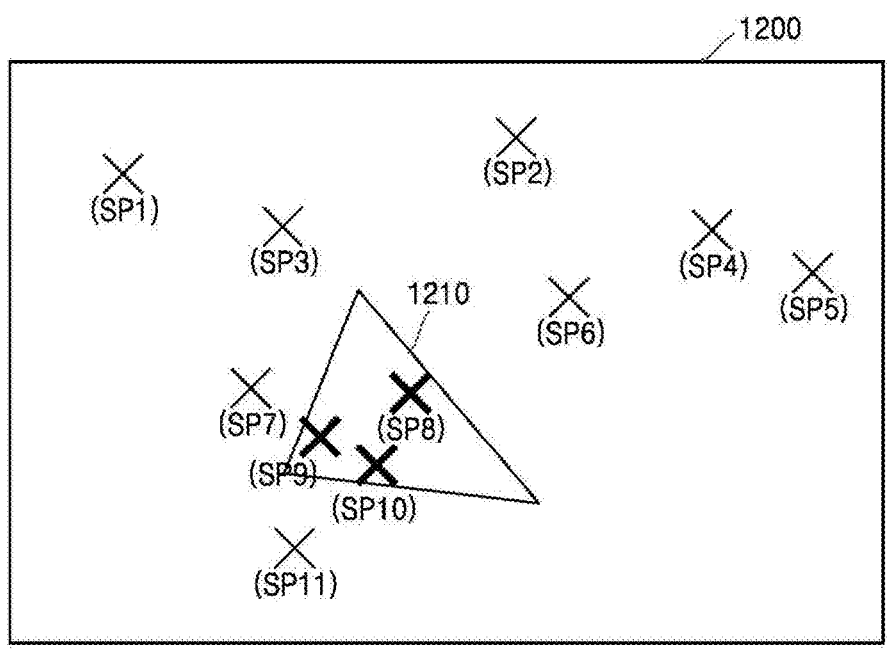
FIG. 12 is a drawing describing a method of searching for a sampling point overlapping a primitive on a viewport in a rasterizer, according to one or more embodiments.

FIG. 12 is a drawing describing a method of searching for a sampling point overlapping a primitive on a viewport in a rasterizer, according to one or more embodiments. Here, while aspects of FIG. 12 may be explained with reference to components of FIG. 5, embodiments are not limited to the same and alternative implementations and applications are available.

Referring to FIG. 12, location information of sampling points SP1 to SP11 determined by a sampling shader, such as the sampling shader 150 of FIG. 5, may be stored in buffers, such as buffers 192 of FIG., or memory, such as memory 30 of FIG. 1. Information about the mapping relationship may also be stored in the buffers or memory. Briefly, the illustrated sampling points SP1-SP11 of FIG. 12 are not intended to be the same as the sampling points described in FIGS. 8A-9. A rasterizer, such as the rasterizer of 160 of FIG. 5, may read location information of all sampling points SP1 to SP11 from the buffers or the memory for the searching and determining of sampling point(s) that overlap a primitive 1210 on a viewport 1200. Thereafter, the rasterizer may compare the location information of the primitive 1210 with the location information of the sampling points SP1 to SP11 to determine that sampling points SP8, SP9, and SP10 overlap the primitive 1210.

Figure 13:
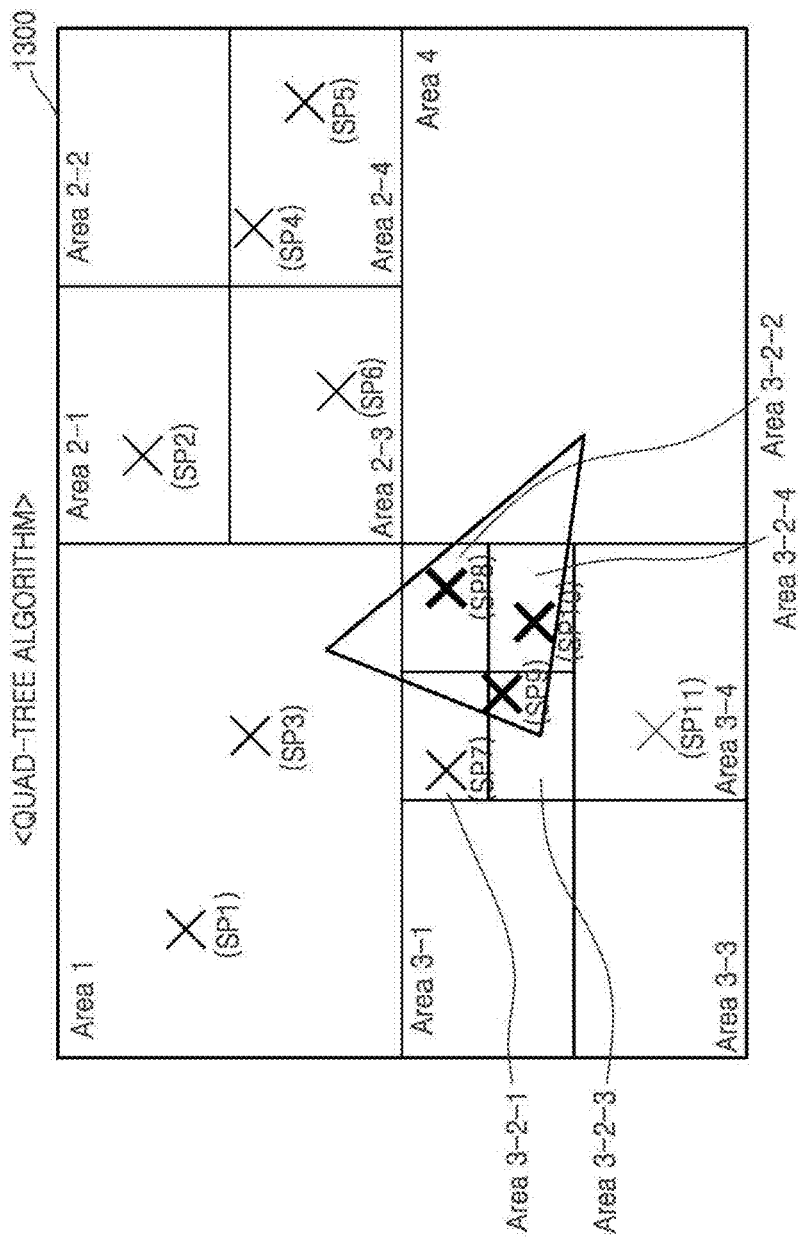
FIG. 13 is a drawing describing a method of searching for a sampling point overlapping a primitive on a viewport in a rasterizer, according to one or more embodiments.

FIG. 13 is a drawing describing a method of searching for a sampling point overlapping a primitive on a viewport in a rasterizer, according to one or more embodiments. Here, while aspects of FIG. 13 may be explained with reference to components of FIGS. 1 and 5, embodiments are not limited to the same and alternative implementations and applications are available.

Referring to FIG. 13, a rasterizer, such as rasterizer 160 of FIG. 5, may search for a sampling point overlapping a primitive on a viewport 1300. For example, when the location information of the sampling points in a quadtree format, the rasterizer may search for a sampling point overlapping the primitive using a quadtree algorithm. As described with reference to FIG. 12, location information of sampling points SP1 to SP11 may be determined by a sampling shader, such as the sampling shader 150 of FIG. 5, and stored in buffers, such as buffers 192 of FIG. 5, or memory, such as memory 30 of FIG. 1. In addition to the location information of the respective sampling points, a corresponding GPU, such as GPU 10 of FIG. 5, may also store information about the respective Areas 1 to 4, to which sampling points SP1 to SP11 respectively belong, e.g., in the buffers or memory using the quadtree algorithm.

For example, the GPU may set a predetermined maximum number (for example, two) and repeatedly divide a region including sampling points S1 to S11 into four equal smaller areas until the number of sampling points belonging to each area is less than or equal to the maximum number two. That is, because there are a total of 11 sampling points SP1 to SP11 in a total region of a viewport 1300, the GPU may divide the entire region of the viewport 1300 into four equal Areas 1 to 4. Because there are only a total of two sampling points SP1 and SP3 in Area 1, the GPU no longer divides Area 1. Because there are a total of four sampling points SP2, SP4, SP5, and SP6 in Area 2, the GPU divides Area 2 into four equal Areas 2-1, 2-2, 2-3, and 2-4. Because there is one sampling point SP2 in Area 2-1, the GPU no longer divides Area 2-1. In addition, because there are two or fewer sampling points in the remaining Areas 2-2 to 2-4, the GPU no longer divides Areas 2-2 to 2-4. In a similar scheme, the GPU divides Area 3-1, Area 3-2-1, Area 3-2-2, Area 3-2-3, Area 3-2-4, Area 3-3 and Area 3-4.

The GPU may stores information about the respective sampling points belonging to each of Areas 1 to 4, into which a region is divided by the quadtree algorithm, and respective location information about each of Areas 1 to 4 in the buffers or memory.

The rasterizer may read information related to Areas 1 to 4 into which the whole region is divided from the buffers or memory to search for a sampling point overlapping the primitive. That is, when the location information of the sampling points is stored in a quadtree format, it is unnecessary for the rasterizer to read location information about all sampling points. For example, with the approach of FIG. 12, the rasterizer may read location information for all sampling points, while with the quadtree approach of FIG. 13 the rasterizer may only desire to read location information for relevant sampling points. The rasterizer may compare the location information of a primitive 1310 with the respective location information of Areas 1 to 4 to determine that only Area 1, Area 3-2-1, Area 3-2-2, Area 3-2-3, Area 3-2-4, and Area 4 overlap the primitive 1210. Thereafter, the rasterizer may desire to only compare location information of sampling points SP1, SP3, SP7, SP8, SP9, and SP10 belonging to the overlapping Area 1, Area 3-2-1, Area 3-2-2, Area 3-2-3, Area 3-2-4, and Area 4 with the location information of the primitive 1310 to determine that sampling points SP8, SP9, and SP10 overlap the primitive 1310.

Thus, according to an embodiment, such as when information of the divided regions of the sampling points is also stored, e.g., according to a quadtree algorithm, it may be unnecessary for the rasterizer to read unnecessary location information of the sampling points SP2, SP4, SP5, SP6, and SP11. Alternative storage, reading, and searching approaches are also available, depending on embodiment, so that a search scheme of the rasterizer is not limited to any one type.

Figure 14:
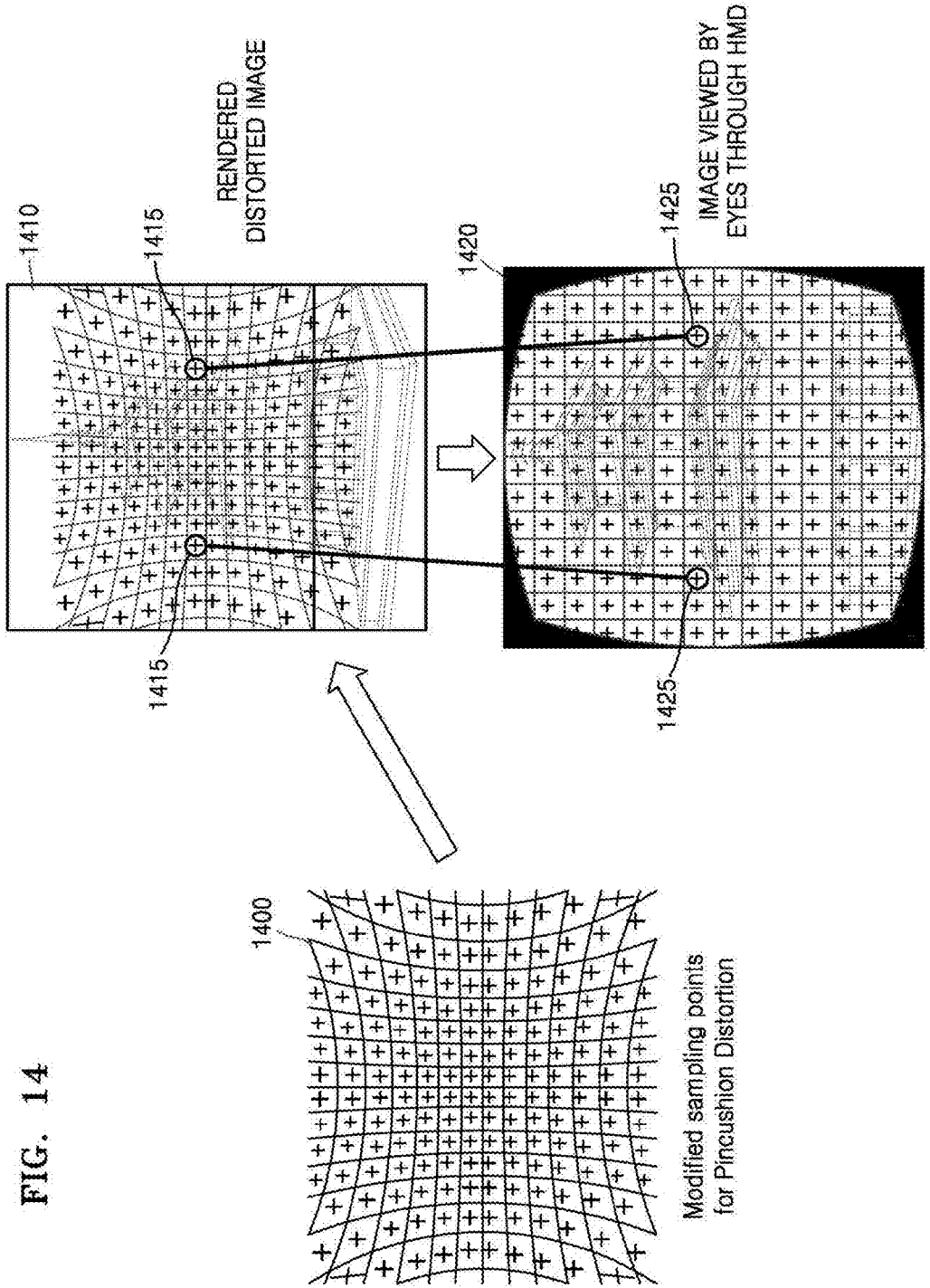
FIG. 14 is a drawing describing a method by which a rendered distorted image is displayed on a head mounted display (HMD) system using a sampling point based on a pincushion distortion pattern, according to one or more embodiments.

FIG. 14 is a drawing describing a method by which a rendered distorted image is displayed on an HMD system using a sampling point based on a pincushion distortion pattern, according to one or more embodiments. Here, while aspects of FIG. 14 may be explained with reference to components of FIGS. 1 and 3, embodiments are not limited to the same and alternative implementations and applications are available.

Referring to FIG. 14, a distorted image due to a pincushion distortion pattern may be displayed on a display panel when a lens of a HMD device or system is a convex lens. As only an example, FIG. 3 demonstrates such a HMD device or system. A GPU, such as GPU 10 of FIG. 1, for the HMD system may determine a sampling grid 1400 of sampling points based on the pincushion distortion pattern and may render a distorted image 1410 using the determined sampling grid 1400. When the distorted image 1410 based on the pincushion distortion pattern is displayed on the display panel of the HMD system, the user may view an image 1420 without distortion through the lens of the HMD system. That is, because of the convex characteristic of the lens, and according to the mapped locations of the sampling points 1415, distorted pixels on the distorted image 1415 may appear to correspond to screen pixels 1425 of a regular grid pattern or an undistorted image.

Figure 15A:
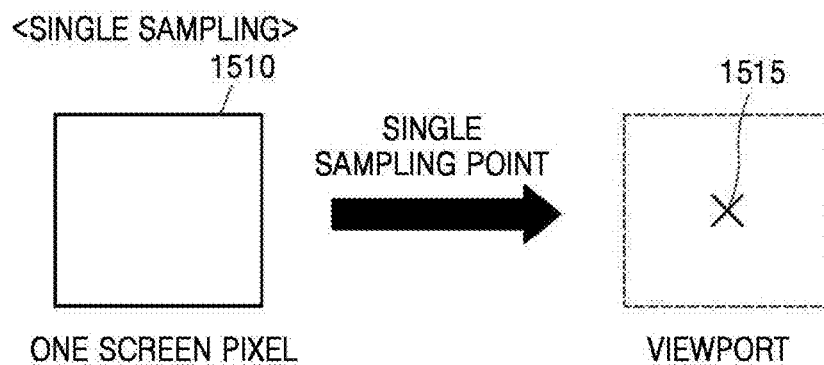
FIGS. 15A and 15B are drawings describing single sampling and multisampling, according to two or more embodiments.
Figure 15B:
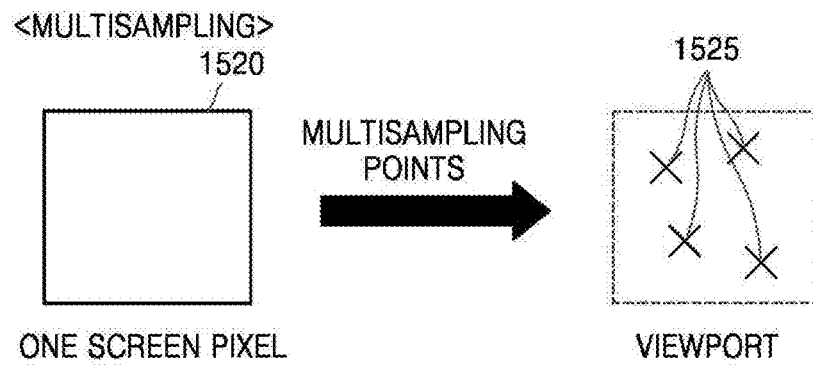

FIGS. 15A and 15B are drawings describing single sampling and multisampling, according to two or more embodiments. Here, while aspects of FIGS. 15A and 15B may be explained with reference to components of FIG. 5, embodiments are not limited to the same and alternative implementations and applications are available.

A GPU, such as the GPU 10 of FIG. 5, may enable or disable multisampling for a sampling point to be processed in a graphics pipeline, such as the graphics pipeline 100 of FIG. 5.

Referring to FIG. 15A, the sampling shader, such as sampling shader 150 of FIG. 5, may determine or generate only a single sampling point 1515 for each screen pixel 1510 when the multisampling is disabled or selected to not be implemented, thereby implementing single sampling. However, referring to FIG. 15B, when the multisampling is enabled or selected to be implemented, the sampling shader may determine two or more multisampling points 1525 for each screen pixel 1520. Thus, similar to the above discussions regarding a sampling point being generated for each screen pixel, the same discussions are applicable to embodiments where the multisampling is enabled, with two or more sampling points being determined for each of the screen pixels and the locations of the sampling pixels being arranged or mapped in proportion to a degree to which each of the screen pixels is set to be distorted due to a select distortion pattern.

Figure 16:
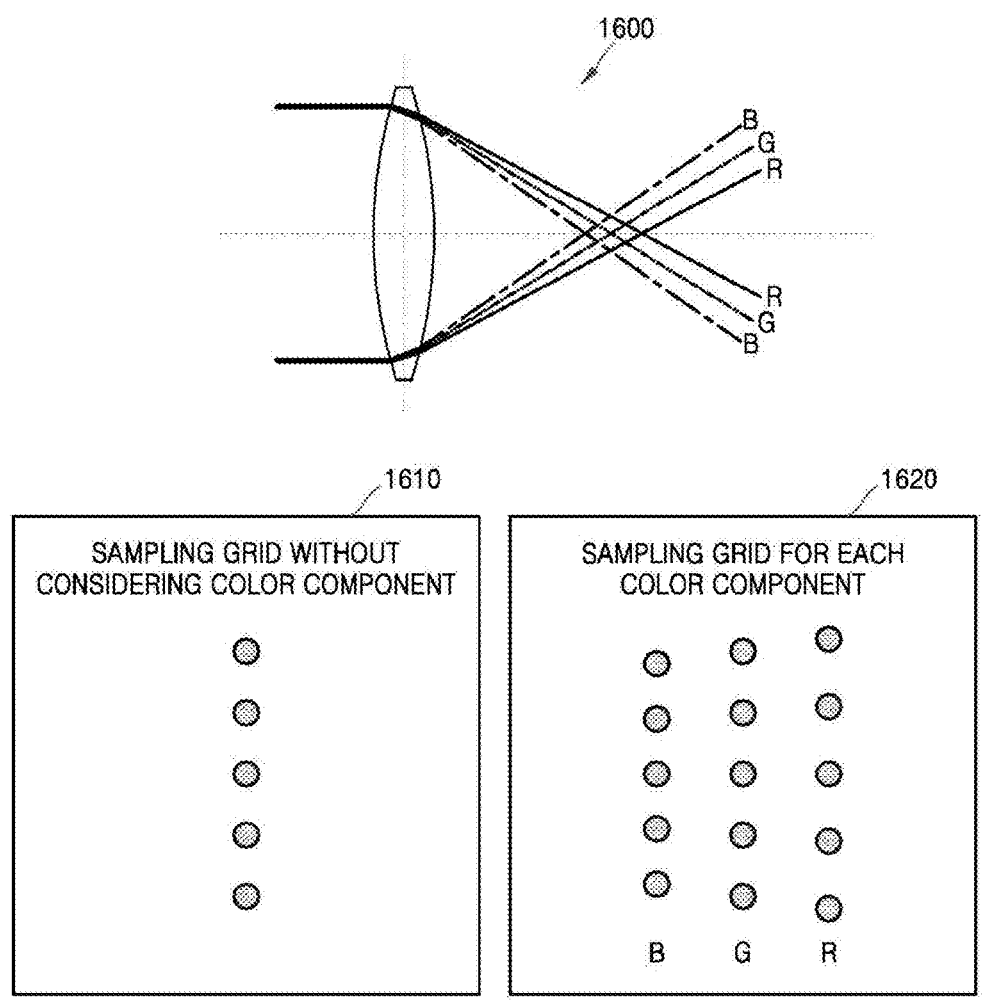
FIG. 16 is a drawing describing a process of determining locations of different sampling points for each color component for a screen pixel, according to one or more embodiments.

FIG. 16 is a drawing describing a process of determining locations of different sampling points for each color component for a screen pixel, according to one or more embodiments. Here, while aspects of FIG. 16 may be explained with reference to components of FIG. 5, embodiments are not limited to the same and alternative implementations and applications are available.

In addition to the above, in one or more embodiments, a sampling shader, such as the sampling shader 150 of FIG. 5, may determine such locations of the sampling points in consideration of the different color components.

Because wavelengths differ according to each color component, refractions of light corresponding to color components transmitted through a lens may be different from each other. When the color components are red (R), green (G), and blue (B), for example, as indicated by reference numeral 1600, refraction indices of R, G, and B are different from one another. In consideration of this natural phenomenon, the sampling shader may determine respective locations of sampling points by compensating for respective offsets differing according to each color component. For example, sampling grid 1610 demonstrates a sampling grid where the locations of the sampling points may be determined based on the desired distortion pattern. Rather, referring to sampling grid 1620, for each color component, the sampling shader may determine an interval between sampling points corresponding to the color component B, which is narrower than an interval between sampling points corresponding to the color component G, and determine the interval between the sampling points corresponding to the color component G, which is narrower than a determined interval between sampling points corresponding to the color component R. Accordingly, for a particular screen pixel, the sampling shader may separately determine a location of a sampling point corresponding to the color component B, a location of a sampling point corresponding to the color component G, and a location of a sampling point corresponding to the color component R for one screen pixel. When distortion is applied, the sampling shader also considers the distortion pattern, to determine the mapped locations of the R, G, and B sampling points for a corresponding screen pixel. Accordingly, as only an example, a pixel shader, such as the pixel shader 170 of FIG. 5, may then be used to select a color component-specific sampling point suitable for a distribution of color components to be shaded for any pixel and perform pixel shading for that pixel.

Figure 17:
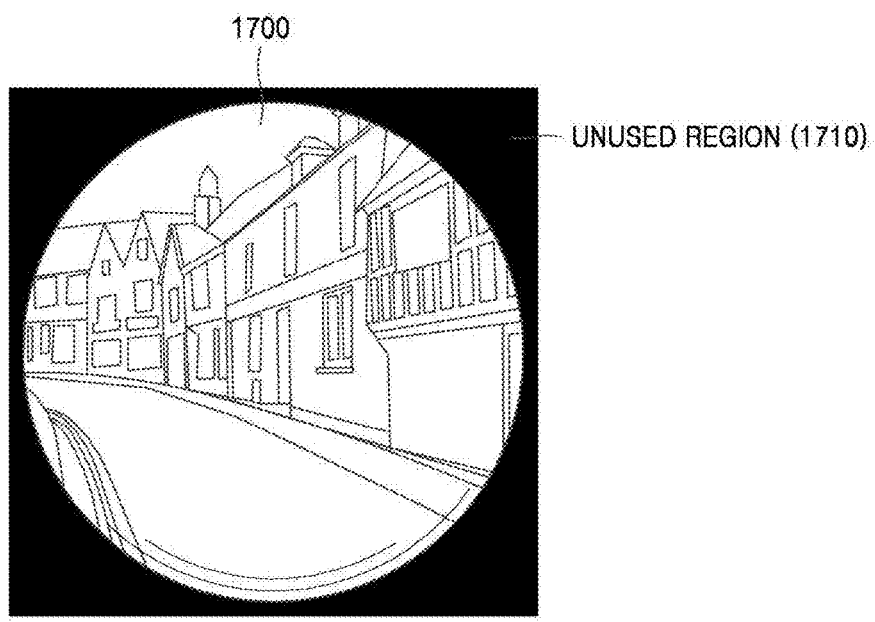
FIG. 17 is a drawing describing a method by which a distorted image is rendered when there is an unused region based on an applied distortion pattern, according to one or more embodiments.

FIG. 17 is a drawing describing a method by which a distorted image is rendered when there is an unused region based on a distortion pattern, according to one or more embodiments.

Referring to FIG. 17, an unused region 1710 could result from the rendering process when the display renders a distorted image 1700 instead of the undistorted original image. However, as discussed above with regard to FIG. 11, in one or more embodiments, a GPU may implement a skipping process to skip rasterizing and pixel shading of the unused area, which also increases the overall calculation speed and reduces the overall calculation amount for rendering the distorted image 1700.

Figure 18:
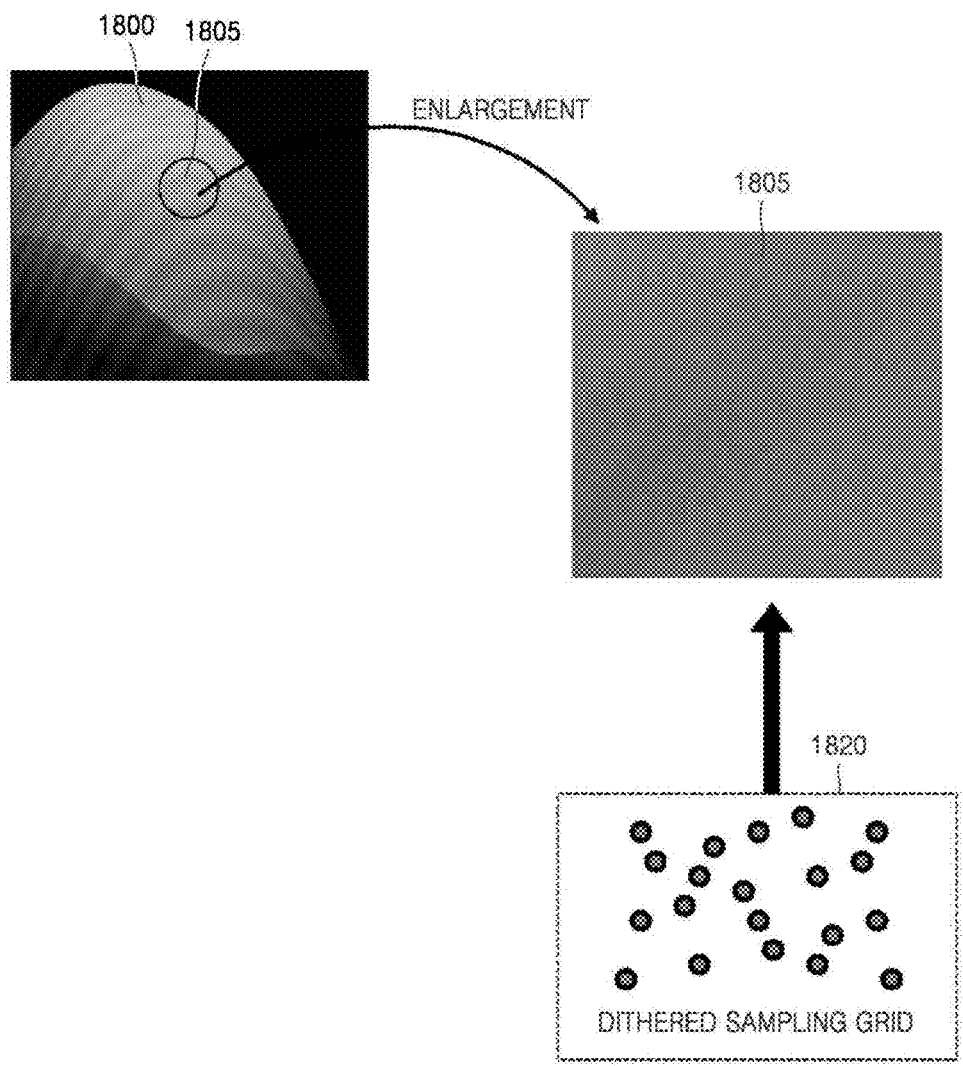
FIG. 18 is a drawing describing a method by which a sampling shader determines sampling points for dithering, according to one or more embodiments.

FIG. 18 is a drawing describing a method by which a sampling shader determines sampling points for dithering, according to one or more embodiments. Here, while aspects of FIG. 18 may be explained with reference to components of FIG. 5, embodiments are not limited to the same and alternative implementations and applications are available.

Referring to FIG. 18, a dithering algorithm may be used to render a distorted image 1800. When one region 1805 of the distorted image 1800 is enlarged, pixels dithered by the dithering algorithm may be randomly distributed. A sampling shader, such as the sampling shader 150 of FIG. 5, may determine locations of sampling points to have random locations, as in the illustrated sampling grid 1820, for a particular region 1805 to apply the dithering algorithm for the particular region 1805.

Figure 19:
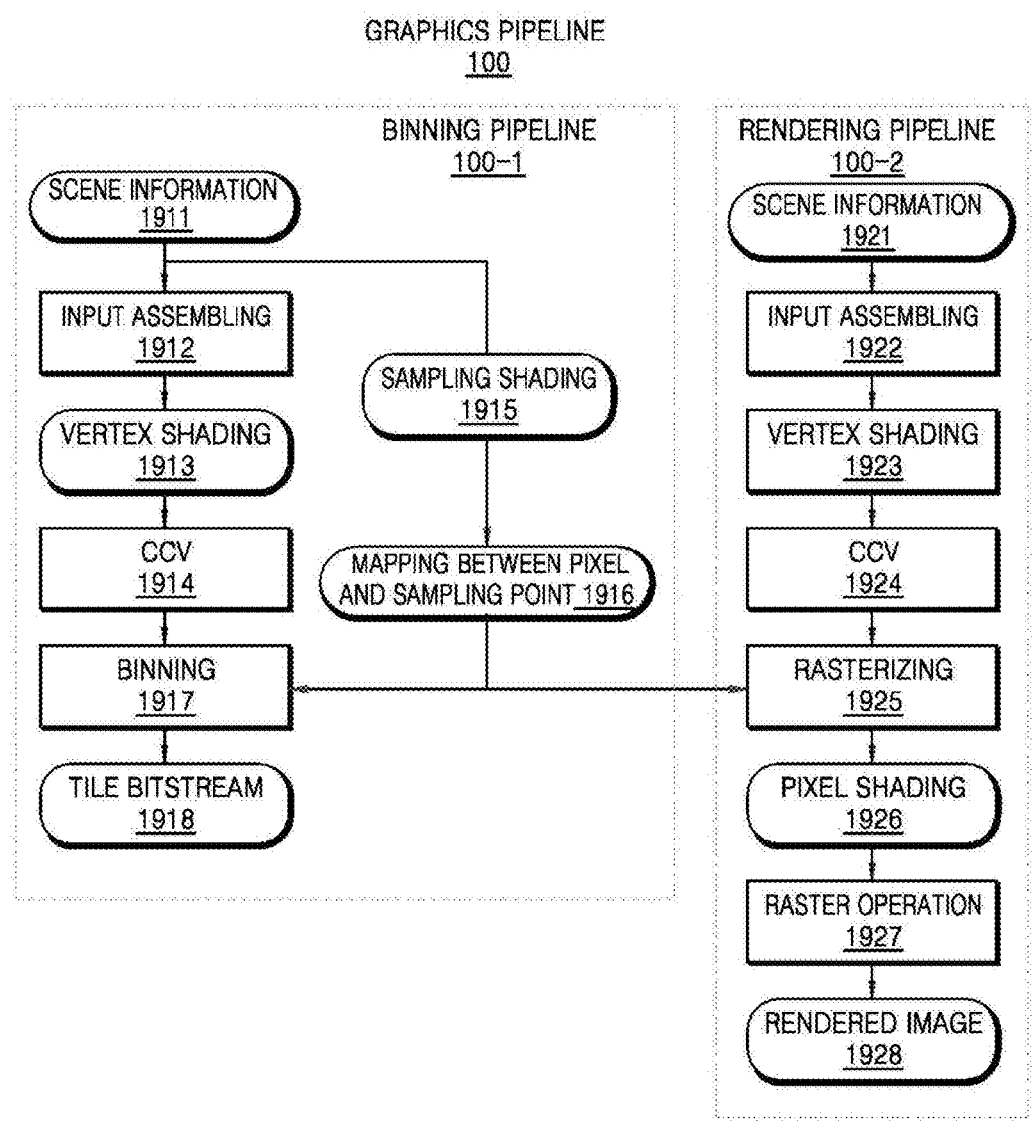
FIG. 19 is a drawing describing a method by which sampling shading is utilized in the case of a graphics pipeline for tile-based rendering, according to one or more embodiments.

FIG. 19 is a drawing describing a method by which sampling shading is utilized in the case of a graphics pipeline for tile-based rendering, according to one or more embodiments. Here, while aspects of FIG. 19 may be explained with reference to components of FIGS. 1 and 5, embodiments are not limited to the same and alternative implementations and applications are available.

Referring to FIG. 19, in one or more embodiments, when a graphics pipeline, such as graphics pipeline 100 of FIG. 5, is used for tile-based rendering, the graphics pipeline 100 may include a pass of a binning pipeline 100-1 for tile binning and a pass of a rendering pipeline 100-2 for rendering.

The binning pipeline 100-1 may include operation 1911 acquiring or receiving scene information (scene description), input assembling 1912, vertex shading 1913, a culling, clipping, and viewport (CCV) transforming 1914, binning 1917, and operation 1918 storing information about a primitive belonging to each tile determined by the binning 1917 in a tile bitstream.

The rendering pipeline 100-2 may include operation 1921 acquiring or receiving scene information, input assembling 1922, vertex shading 1923, CCV transforming 1924, rasterizing 1925, pixel shading 1926, raster operating 1927, and operation 1928 outputting a rendered image.

The binning pipeline 100-1 may further include sampling shading 1915 in which a sampling point (or a location of the sampling point) is determined, e.g., by a sampling shader, such as the sampling shader 150 of FIG. 5, and operation 1916 mapping a location of each of the sampling points for respective pixels for the desired distorted image. Here, in one or more embodiments, the sample shading and mapping operation may be performed in only the binning pipeline 100-1. In further detail, in one or more embodiments, such as illustrated in FIG. 6 and only as an example, the sampling shading 1915 and the mapping operation 1916 may be performed in parallel with the input assembling 1912, the vertex shading 1913, and the CCV transforming 1914 before the binning 1917 is performed. In addition, as demonstrated in FIG. 19, because pixel shading 1926 and raster operation 1927 are performed based on the rasterizing 1925 and binning 1917, the pixel shading 1926 and raster operation 1927 may only need to perform a single pass to output the rendered image with the desired distortion.

Figure 20:
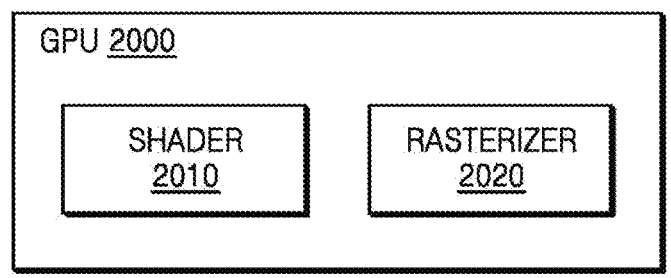
FIG. 20 is a block diagram of an apparatus with a graphics pipeline to render an image with distortion, according to one or more embodiments.

FIG. 20 is a block diagram of an apparatus with a graphics pipeline to render an image with distortion, according to one or more embodiments. Referring to FIG. 20, the apparatus may include a GPU 2000. In an embodiment, the GPU 2000 may operate based on any of the above discussions regarding GPU 10, for example. The GPU 2000 may include a shader 2010 and a rasterizer 2020. As only an example, the shader 2010 of the GPU 2000 may correspond to the sampling shader 150 of the GPU 10 of FIG. 5, and the rasterizer 2020 may correspond to the rasterizer 160 of FIG. 5. That is, in one or more embodiments, the GPU 2000 may include shader and rasterizer similar components among the components of the GPU 10 of FIG. 5, but is not limited thereto. For example, the GPU 2000 may include components other than those similar to the components of the GPU 10, or may include additional similar components of the GPU 10.

The shader 2010 may acquire or receive information about screen pixels of a display, such as of the display panel 40 of FIG. 1. Thereafter, the shader 2010 may determine, for each of the screen pixels, locations of one or more sampling points based on a pattern, e.g., a distortion pattern for a desired distorted image, for representing an image to be rendered.

The rasterizer 2020 may generate a pixel, corresponding to a primitive to be rasterized, at a mapped location of any of the sampling points that overlap the primitive.

Finally, a corresponding graphics pipeline, e.g., which includes the rasterizer 2020, operated by the GPU 2000 renders an image (distorted image) using the pixel generated by the rasterizer 2020, such as described above.

Figure 21:
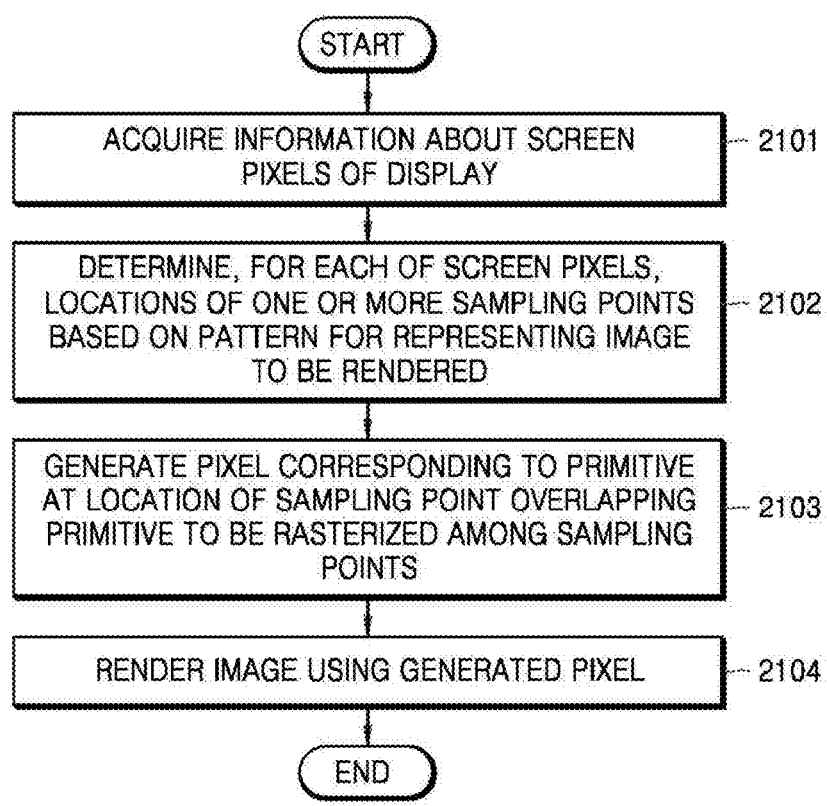
FIG. 21 is a flowchart of a graphics pipeline method for rendering an image with distortion, according to one or more embodiments.

FIG. 21 is a flowchart of a graphics pipeline method for rendering an image with distortion, according to one or more embodiments.

Referring to FIG. 21, the method of operating the graphics pipeline may be a process that is processed in time series within an electronic device, such as the electronic device 1 of FIG. 1, and may be implemented by a graphic processing device, such as the GPU 10 or GPU 2000, as only examples. Here, the above discussions regarding differing aspects of operations of the electronic device 1, any of the GPUs, and any of the sampling shaders discussed above are also incorporated here by reference for the method of operating the graphics pipeline of FIG. 21, so their repeated explanations are omitted below. In addition, through the below operations are explained with reference to components of FIG. 1, 5, or 20, embodiments are not limited to the same and other implementations or applications are also available.

In operation 2101, information about screen pixels of a display may be acquired, be provided, or received. As only an example, the shader 2010 of FIG. 20 or the sampling shader 150 of FIG. 5 may acquire, be provided, or receive the information about the screen pixels.

In operation 2102, locations of one or more sampling points may be determined based on a pattern for representing an image to be rendered. Here, in an embodiment, operation 2102 may include two separate operations where a location of a respective sampling point is determined, e.g., based on determined locations of the screen pixels, and then that determined location is mapped according to a mapping algorithm, such as a select distortion pattern. As only an example of operation 2102, the shader 2010 of FIG. 20 or the sampling shader 150 of FIG. 5 may determine the mapped locations of the sampling points based on such a set pattern.

In operation 2103, a pixel corresponding to a primitive at a mapped location of a sampling point overlapping a primitive to be rasterized among the sampling points may be determined. As only an example, the rasterizer 2020 of FIG. 20 or the rasterizer 160 of FIG. 5 may generate such a pixel corresponding to the primitive at the mapped location of the sampling point overlapping the primitive.

In operation 2104, an image (e.g., distorted image) may be rendered using the generated pixel. As only an example, the GPU 2000 or GPU 10 may render the image using the generated pixel.

In one or more embodiments, it is possible to more efficiently render a distorted image while supporting various alternative graphics pipelines by incorporating a programmable shading stage, such as the aforementioned sampling shader related to the mapping of sampling points, in the alternative graphics pipeline. For example, such an alternative graphics pipeline may only need to be changed by adding such a programmable shading stage, according to one or more embodiments.

The apparatuses, units, modules, devices, and other components illustrated in FIGS. 1, 3, 4B, 5, and 20, for example, that may perform operations described herein with respect to FIGS. 2, 6-19, and 21, for example, are implemented by hardware components. Examples of hardware components include controllers, sensors, memory, drivers, and any other electronic components known to one of ordinary skill in the art. In one example, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing computer readable code, instructions, or software that are executed by the processing device, processor, or computer and that may control the processing device, processor, or computer to implement one or more methods described herein. Hardware components implemented by a processing device, processor, or computer, e.g., by implementing computer execute code, instructions, or software, such as an operating system (OS) and one or more software applications that run on the OS, may perform the operations described herein with respect to FIGS. 2, 6-19, and 21, as only an example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. In addition, connecting lines or connectors shown in the various above referred to apparatus figures are intended to represent example functional relationships and/or physical or logical couplings between the various hardware elements, with many alternative or additional functional relationships, physical connections, or logical connections may be present in a corresponding device embodiment.

The methods illustrated in FIGS. 2, 6-19, and 21 that perform the operations described herein may be performed by a processing device, processor, or a computer as described above executing processor or computer readable code, instructions, or software to perform the operations described herein.

Processor or computer readable code, instructions, or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the processor or computer readable code, instructions, or software include machine code that is directly executed by the processing device, processor, or computer, such as machine code produced by a compiler. In another example, the processor or computer readable code, instructions, or software include higher-level code that is executed by the processing device, processor, or computer using an interpreter, such as implemented with any programming or scripting language such as C, C++, Java, assembler, or the like, with the various algorithms being implemented with any combination of data structures, objects, processes, routines or other programming elements. Based on the disclosure herein, and after an understanding of the same, programmers of ordinary skill in the art can readily write the processor or computer readable code, instructions, or software based on the block diagrams and the flow charts illustrated in the drawings and the corresponding descriptions in the specification, which disclose algorithms for performing the operations performed by the hardware components and the methods as described above.

The processor or computer readable code, instructions, or software to control a processing device, processor, or computer to implement the hardware components, such as discussed in any of FIGS. 1, 3, 4B, 5, and 20, and perform the methods as described above in any of FIGS. 2, 6-19, and 21, and any associated data, data files, and data structures, are recorded, stored, or fixed in or on one or more non-transitory processor/computer-readable storage media. Examples of a non-transitory processor/computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the processor or computer readable code, instructions, or software and any associated data, data files, and data structures in a non-transitory manner and providing the processor or computer readable code, instructions, or software and any associated data, data files, and data structures to a processing device, processor, or computer so that the processing device, processor, or computer can execute the instructions. In one example, the processor or computer readable code, instructions, or software and any associated data, data files, and data structures are distributed over network-coupled computer systems so that the instructions and software and any associated data, data files, and data structures are stored, accessed, and executed in a distributed fashion by the processing device, processor, or computer.

As a non-exhaustive example only, an electronic device embodiment herein, such as the above described electronic device with regard to FIGS. 1, 3, 4B, 5, and 20, and/or configured to implement the methods described with regard to FIGS. 2, 6-19, and 21, may include a mobile device, such as a cellular phone, a smart phone, a wearable smart device, a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. Depending on embodiment, the electronic device includes a display.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed is:

1. A graphics pipeline method, the method comprising:
determining, using one or more processing devices, respective locations of a plurality of sampling points for a plurality of screen pixels of a display, by determining, for each of the screen pixels, a location of a sampling point based on a pattern to modify an image to be rendered;
generating a pixel based on the image and corresponding to a primitive at a determined location of a sampling point, of the plurality of sampling points, determined to overlap the primitive to be rasterized; and
rendering the image using the generated pixel,
wherein a sampling shading stage comprising the determining of the respective locations of the plurality of sampling points is performed in parallel with operation stages comprising a vertex shading stage, a clipping stage, and a projection stage of a graphics pipeline, before an operation stage of a rasterizing stage of the graphics pipeline that performs the generating of the pixel.

2. The method according to claim 1, wherein the pattern is a distortion pattern for applying distortion to the image so that the rendered image is a distortion image.

3. The method according to claim 2, wherein
the determining of the respective locations comprises determining the respective locations of the plurality of sampling points based on respective central locations of each of modified locations of the screen pixels; and
the screen pixels are arranged in an equal distant or repeated grid pattern.

4. The method according to claim 1, further comprising:
acquiring information of a resolution of the screen pixels of the display, the resolution defining locations of the screen pixels; and
wherein the determining of the respective locations further comprises,
converting, based on the information of the resolution, a location of a screen pixel, of the screen pixels, into a location of a corresponding sampling point based on the pattern, and
mapping a location of a pixel of the image to the location of the corresponding sampling point.

5. The method according to claim 1, wherein the sampling shading stage is a programmable stage, implemented by the one or more processing devices processing a shader source code for changing and defining a pattern type, of a plurality of pattern types, of the pattern.

6. The method according to claim 1, wherein the determining of the respective locations comprises:
determining locations of two or more sampling points for one screen pixel when multisampling is determined to be enabled; and
determining a location of a single sampling point for the one screen pixel when the multisampling is determined to be disabled, and
wherein, when the multisampling is determined to be enabled, the respective two or more sampling points determined for each of the screen pixels are arranged in proportion to an extent to which locations of each of the screen pixels are set to be modified by the pattern so that the rendered image is a distortion image.

7. The method according to claim 1, wherein the generating of the pixel comprises:
determining the location of the sampling point by searching for the location of the sampling point, from among select one or more subsets of the determined respective locations of the sampling points, that overlaps the primitive based on a quadtree algorithm that calls for repeatedly subdividing a set of the sampling points into smaller subsets based on regions of a viewpoint to which the plurality of sampling points of the set respectively belong.

8. The method according to claim 1, wherein the determining of the respective locations includes determining locations of respective sampling points for different color components for a screen pixel by respectively applying different offsets when determining the locations of the respective sampling points for the different color components for the screen pixel.

9. The method according to claim 1, wherein the sampling shading stage is performed in a single pass of a tile binning operation when the graphics pipeline is a graphics pipeline for tile-based rendering.

10. A non-transitory processor-readable medium comprising computer readable code to control at least one processing device to implement the method according to claim 1.

11. A graphics pipeline apparatus, the apparatus comprising:
a sampling shader configured to determine respective locations of a plurality of sampling points for a plurality of screen pixels of a display, by determining, for each of the screen pixels, a location of a sampling point based on a pattern to modify an image to be rendered; and
a rasterizer configured to generate a pixel based on the image and corresponding to a primitive at a determined location of a sampling point, of the plurality of sampling points, determined to overlap the primitive to be rasterized, and to output the generated pixel to render the image,
wherein the sampling shader is further configured to perform a sampling shading stage for the determination of the respective locations before the rasterizer performs a rasterization operation stage of the generated pixel as the outputting of the generated pixel to render the image, and in parallel with operation stages comprising a vertex shading stage, a clipping stage, and a projection stage.

12. The apparatus according to claim 11, wherein the pattern is a distortion pattern for applying distortion to the image so that the rendered image is a distortion image.

13. The apparatus according to claim 12, wherein the sampling shader is further configured to determine the respective locations of the sampling points based on respective central locations of each of modified locations of the screen pixels, and wherein the screen pixels are arranged in an equal distant or repeated grid pattern.

14. The apparatus according to claim 11, wherein
the sampling shader is further configured to acquire information of a resolution of the screen pixels of the display, the resolution defining locations of the screen pixels, and
in the determining of the respective locations, the sampling shader is further configured to convert, based on the information of the resolution, a location of a screen pixel, of the screen pixels, into a location of a corresponding sampling point based on the pattern, and maps a location of a pixel of the image to the location of the corresponding sampling point.

15. The apparatus according to claim 11, wherein the sampling shader is configured as a programmable shader stage, of a graphics processing device, configured to process a shader source code for changing and defining a pattern type, of a plurality of pattern types, of the pattern.

16. The apparatus according to claim 11, wherein
the sampling shader is configured to determine locations of two or more sampling points for one screen pixel when multisampling is determined to be enabled and configured to determine a location of a single sampling point for the one screen pixel when the multisampling is determined to be disabled; and
when the multisampling is determined to be enabled, the respective two or more sampling points determined for each of the screen pixels are arranged in proportion to an extent to which locations of each of the screen pixels are set to be modified by the pattern so that the rendered image is a distortion image.

17. The apparatus according to claim 11, wherein, in the generating of the pixel, the rasterizer is further configured to determine the location of the sampling point by searching for the location of the sampling point, from among select one or more subsets of the determined locations of the sampling points, that overlaps the primitive based on a quadtree algorithm that calls for repeatedly subdividing a set of the sampling points into smaller subsets based on regions of a viewpoint to which the sampling points of the set respectively belong.

18. The apparatus according to claim 11, wherein, in the determining of the respective locations, the sampling shader is further configured to determine locations of respective sampling points for different color components for a screen pixel by respectively applying different offsets when determining the locations of the respective sampling points for the different color components for the screen pixel.

* * * * *